(12) United States Patent
Chen et al.

(10) Patent No.: US 8,934,350 B2
(45) Date of Patent: Jan. 13, 2015

(54) CHANNEL STATE INFORMATION FEEDBACK FOR CARRIER AGGREGATION WITH FLEXIBLE CARRIER CONFIGURATIONS

(75) Inventors: Wanshi Chen, San Diego, CA (US); Juan Montojo, Nuremberg (DE); Peter Gaal, San Diego, CA (US); Jelena M. Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 13/455,010

(22) Filed: Apr. 24, 2012

(65) Prior Publication Data

US 2012/0300641 A1    Nov. 29, 2012

Related U.S. Application Data

(60) Provisional application No. 61/489,129, filed on May 23, 2011.

(51) Int. Cl.
| | |
|---|---|
| H04L 12/26 | (2006.01) |
| H04L 25/02 | (2006.01) |
| H04L 1/00 | (2006.01) |
| H04L 5/00 | (2006.01) |
| H04L 5/14 | (2006.01) |
| H04L 1/18 | (2006.01) |

(52) U.S. Cl.
CPC .......... *H04L 25/0228* (2013.01); *H04L 1/0026* (2013.01); *H04L 1/0027* (2013.01); *H04L 1/0029* (2013.01); *H04L 5/001* (2013.01); *H04L 5/0048* (2013.01); *H04L 5/0053* (2013.01); *H04L 5/1469* (2013.01); *H04L 1/1812* (2013.01)
USPC ........................................... 370/241; 370/345

(58) Field of Classification Search
None
See application file for complete search history.

(56) References Cited

U.S. PATENT DOCUMENTS

| | | | |
|---|---|---|---|
| 8,315,639 B2 * | 11/2012 | Kim et al. ...................... | 455/450 |
| 2006/0165008 A1 * | 7/2006 | Li et al. ......................... | 370/252 |

(Continued)

FOREIGN PATENT DOCUMENTS

WO    WO 2011158921 A1    12/2011

OTHER PUBLICATIONS

International Search Report and Written Opinion—PCT/US2012/035020—ISA/EPO—Aug. 6, 2012.

(Continued)

*Primary Examiner* — Kevin C Harper
(74) *Attorney, Agent, or Firm* — Fulbright & Jaworski LLP

(57) ABSTRACT

Techniques for reporting channel state information (CSI) are disclosed. A user equipment (UE) may be configured for operation on multiple carriers with different configurations, e.g., FDD and TDD carriers and/or carriers with different uplink-downlink configurations. The multiple carriers may have different subframes for making measurements for CSI and/or different subframes for sending CSI. In response to a CSI request, the UE may determine at least one reference subframe to use for determining CSI for the multiple carriers. The reference subframe may be common to the plurality of carriers and may, for example, be based the subframe in which the CSI request in sent. Alternatively, the reference subframe may be different for different carriers such as when it is based on different HARQ timelines applicable for the different carriers. The UE may determine the CSI for the multiple carriers based on the reference subframe(s) and may report the CSI.

32 Claims, 14 Drawing Sheets

(56) References Cited

U.S. PATENT DOCUMENTS

| | | | | |
|---|---|---|---|---|
| 2009/0252077 | A1* | 10/2009 | Khandekar et al. | 370/312 |
| 2010/0124195 | A1* | 5/2010 | Chun et al. | 370/329 |
| 2011/0141926 | A1* | 6/2011 | Damnjanovic et al. | 370/252 |
| 2011/0242982 | A1 | 10/2011 | Lunttila et al. | |
| 2011/0249578 | A1* | 10/2011 | Nayeb Nazar et al. | 370/252 |
| 2011/0269490 | A1 | 11/2011 | Earnshaw et al. | |
| 2011/0305161 | A1 | 12/2011 | Ekpenyong et al. | |
| 2011/0319068 | A1 | 12/2011 | Kim et al. | |
| 2012/0082038 | A1* | 4/2012 | Xu et al. | 370/244 |
| 2013/0039327 | A1* | 2/2013 | Gao et al. | 370/329 |

OTHER PUBLICATIONS

Qualcomm Incorporated: "Clarification of CSI feedback for deactivated CCs", 3GPP Draft; R1-111675 Clarification of CSI Feedback for Deactivated CCS, 3rd Generation Partnership Project (3GPP), Mobile Competence Centre ; 650, Route Des Lucioles ; F-06921 Sophia-Antipolis Cedex ; France, vol. RAN WG1, no. Barcelona, Spain; 20110509, May 3, 2011, XP050491297, [retrieved on May 3, 2011] the whole document.

Samsung: "CQI Reference Resource Timing for LTE-A", 3GPP Draft; R1-110089, 3rd Generation Partnership Project (3GPP), Mobile Competence Centre ; 650, Route Des Lucioles ; F-06921 Sophia-Antipolis Cedex ; France, vol. RAN WG1, no. Dublin, Ireland; 20110117, Jan. 12, 2011, XP050490306, [retrieved on Jan. 12, 2011] section 1 Introduction section 7.2.3 Channel quality indicator (CQI) definition.

Samsung: "Details of CQI definition for LTE-A", 3GPP Draft; R1-106034, 3rd Generation Partnership Project (3GPP), Mobile Competence Centre ; 650, Route Des Lucioles RAN WG1, no. Jacksonville, USA; 20101115, Nov. 9, 2010, XP050466815, [retrieved on Nov. 9, 2010] section 1 Introduction section 3 CQI definition for Rel-10 section 7.2.3 Channel quality indicator (CQI) definition.

\* cited by examiner

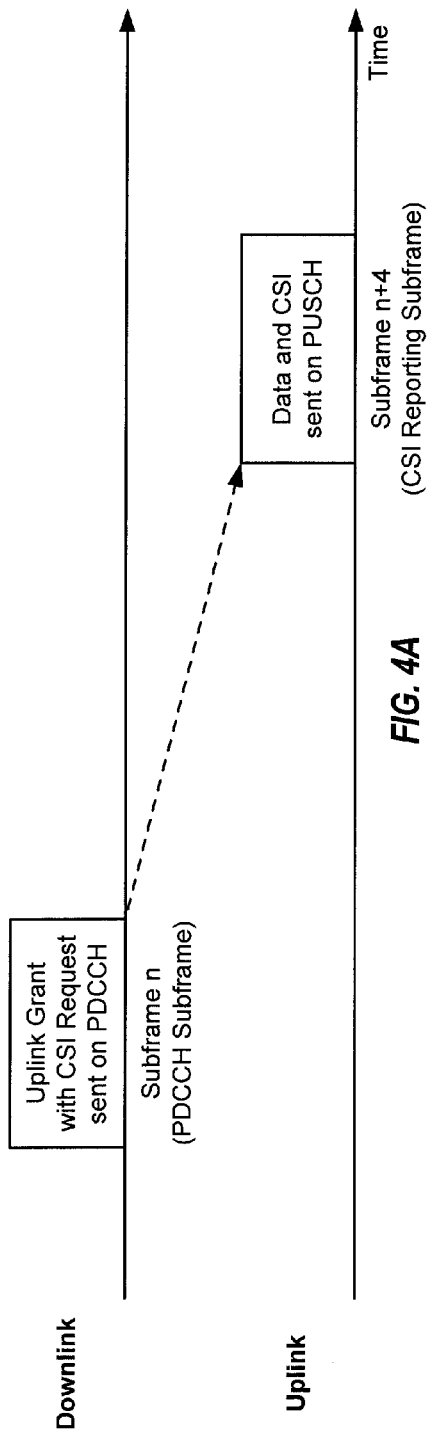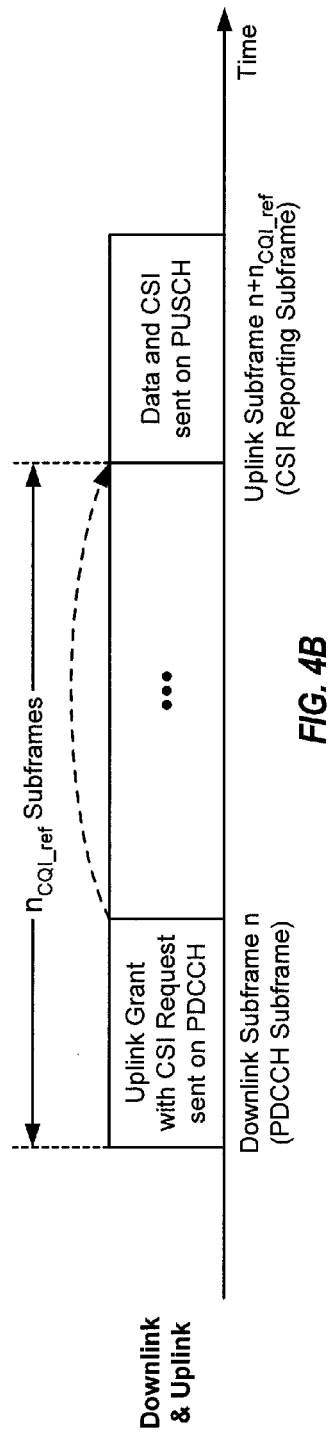
FIG. 4A
FIG. 4B

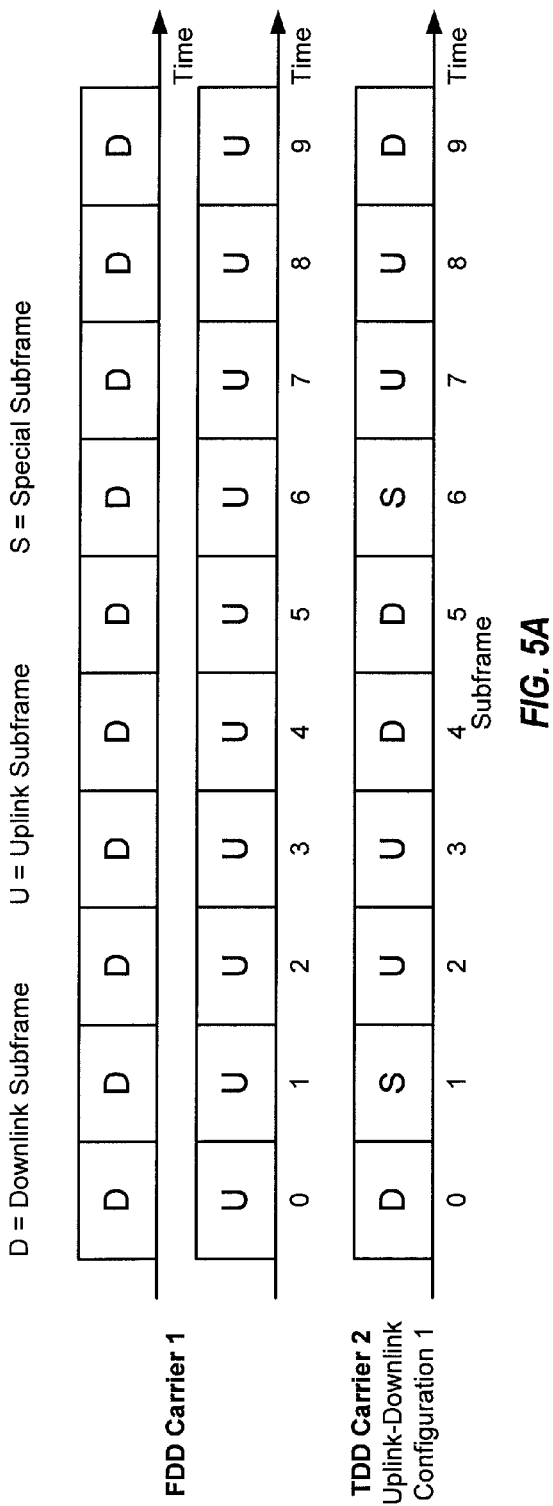
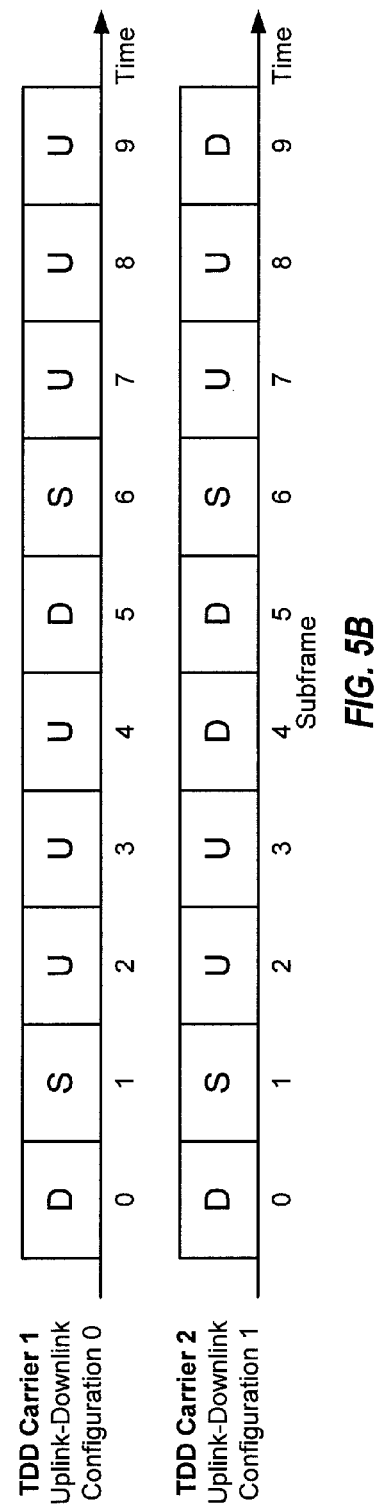
FIG. 5A
FIG. 5B

US 8,934,350 B2

CHANNEL STATE INFORMATION FEEDBACK FOR CARRIER AGGREGATION WITH FLEXIBLE CARRIER CONFIGURATIONS

The present application claims priority to provisional U.S. Application Ser. No. 61/489,129, entitled "CHANNEL STATE INFORMATION FEEDBACK FOR CARRIER AGGREGATION WITH FLEXIBLE CARRIER CONFIGURATIONS," filed May 23, 2011, and incorporated herein by reference in its entirety.

BACKGROUND

I. Field

The present disclosure relates generally to communication, and more specifically to techniques for reporting channel state information (CSI) in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc. A base station may send data and control information on one or more carriers to a UE. The UE may send control information to support data transmission by the base station.

SUMMARY

Techniques for reporting channel state information (CSI) for carriers with different configurations are disclosed herein. A UE may be configured for operation on multiple carriers with different configurations for carrier aggregation. For example, the multiple carriers may include (i) at least one carrier configured for frequency division duplexing (FDD) and at least one carrier configured for time division duplexing (TDD) and/or (ii) carriers with different uplink-downlink configurations. The multiple carriers may have different subframes available for making measurements for CSI and/or different subframes available for sending CSI.

In one design, the UE may determine at least one reference subframe for determining CSI for a plurality of carriers having at least two different configurations. A reference subframe is a subframe in which measurements of a reference signal may be made to determine CSI. The UE may determine the CSI for the plurality of carriers based on the at least one reference subframe. The UE may report the CSI for the plurality of carriers to a base station.

In one design, the UE may determine a single reference subframe for all of the plurality of carriers. For example, the UE may receive a CSI request for the plurality of carriers in a first subframe and may determine the single reference subframe based on the first subframe. In another design, the UE may determine a reference subframe for each carrier, e.g., based on a second subframe in which the CSI for the plurality of carriers is sent and a hybrid automatic retransmission (HARQ) timeline for that carrier.

In one design, for aperiodic CSI reporting, the UE may determine and report the CSI for the plurality of carriers in response to a CSI request. In another design, for periodic CSI reporting, the UE may determine and report the CSI for the plurality of carriers based on a configuration for periodic reporting of CSI by the UE.

Various aspects and features of the disclosure are described in further detail below.

BRIEF DESCRIPTION OF THE DRAWINGS

FIG. 4A shows aperiodic CSI reporting for FDD.
FIG. 4B shows aperiodic CSI reporting for TDD.
FIGS. 5A and 5B show exemplary deployments of two carriers with different configurations.

DETAILED DESCRIPTION

The techniques described herein may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA and E-UTRA are part of Universal Mobile Telecommunication System (UMTS).

3GPP Long Term Evolution (LTE) and LTE-Advanced (LTE-A), in both FDD and TDD, are recent releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
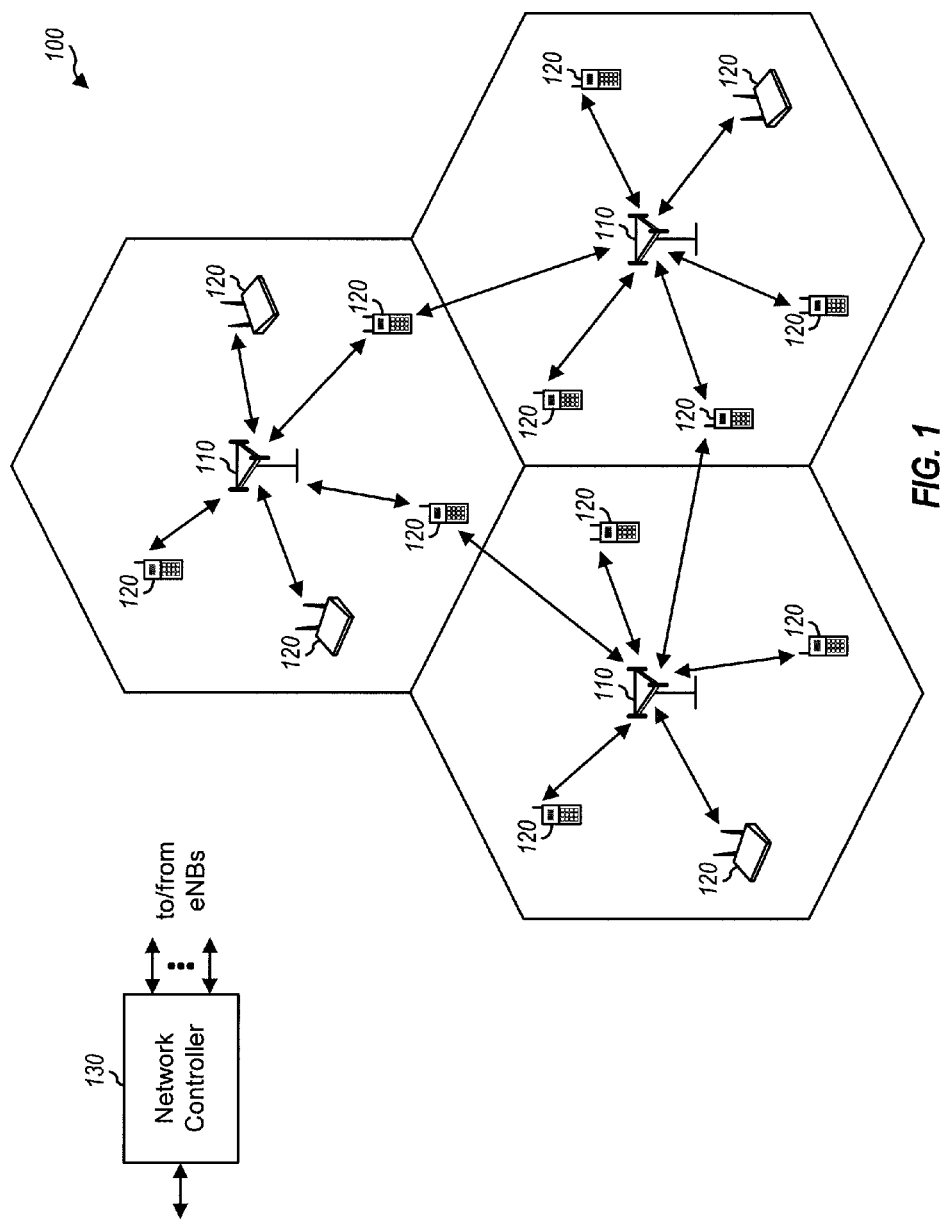
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB may be an entity that communicates with the UEs and may also be referred to as a base station, a Node B, an access point, etc. Each eNB 110 may provide communication coverage for a particular geographic area and may support communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. In general, an eNB may support one or multiple (e.g., three) cells. The term "cell" may also refer to a carrier on which an eNB operates.

Wireless network 100 may also include relays. A relay may be an entity that receives a transmission of data from an upstream entity (e.g., an eNB or a UE) and sends a transmission of the data to a downstream entity (e.g., a UE or an eNB). A relay may also be a UE that relays transmissions for other UEs.

A network controller 130 may couple to a set of eNBs and may provide coordination and control for these eNBs. Network controller 130 may communicate with the eNBs via a backhaul. The eNBs may also communicate with one another via the backhaul.

UEs 120 may be dispersed throughout the wireless network, and each UE may be stationary or mobile. A UE may also be referred to as a mobile station, a terminal, an access terminal, a subscriber unit, a station, a node, etc. A UE may be a cellular phone, a smartphone, a tablet, a personal digital assistant (PDA), a wireless modem, a wireless communication device, a handheld device, a laptop computer, a cordless phone, a wireless local loop (WLL) station, a netbook, a smartbook, etc. A UE may be able to communicate with eNBs, relays, other UEs, etc.

Wireless network 100 may utilize FDD and/or TDD. For FDD, the downlink and uplink may be allocated separate frequency channels. Downlink transmissions may be sent on one frequency channel, and uplink transmissions may be sent on another frequency channel. For TDD, the downlink and uplink may share the same frequency channel, and downlink transmissions and uplink transmissions may be sent on the same frequency channel in different time periods.

Figure 2:
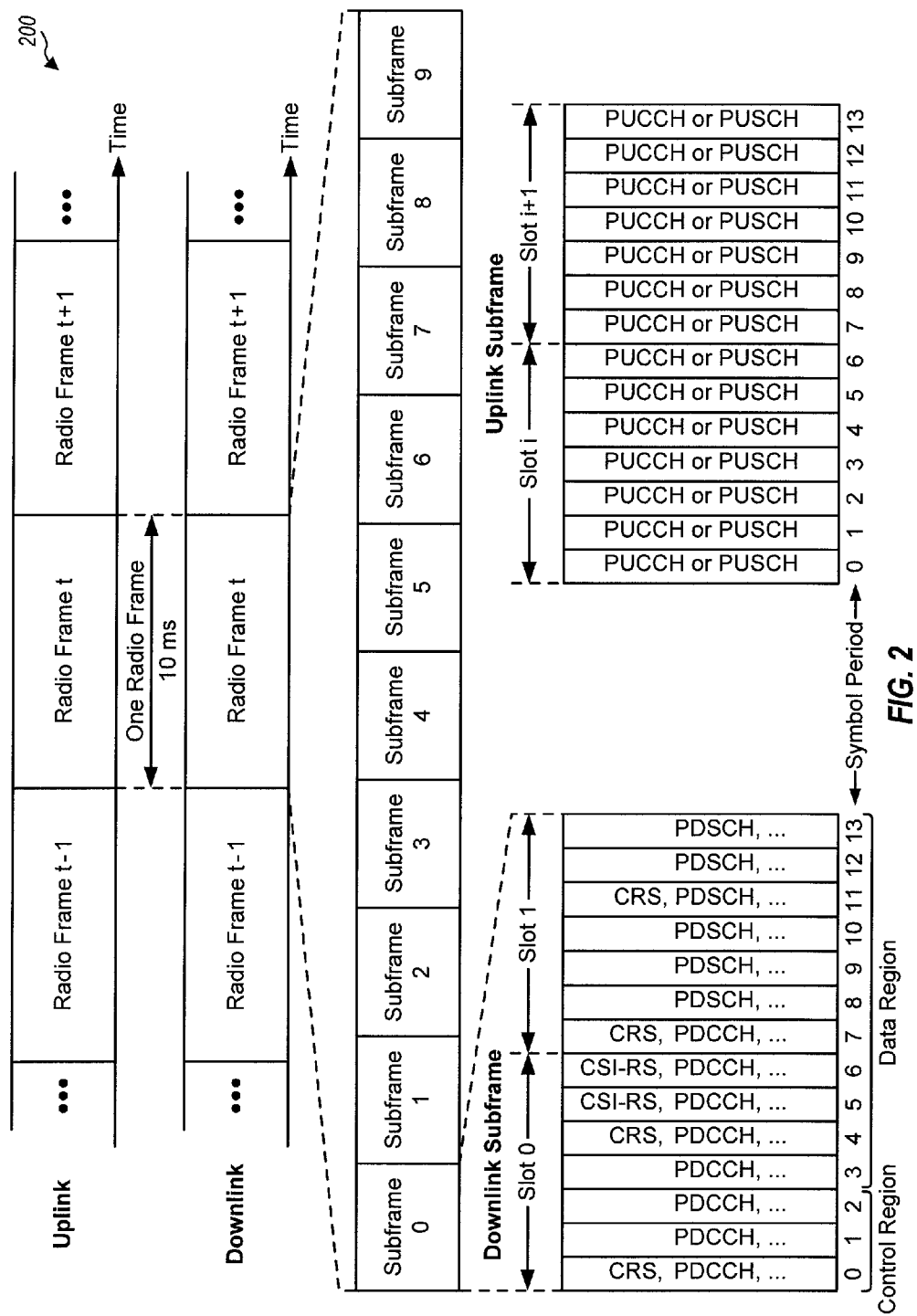
FIG. 2 shows an exemplary frame structure for FDD.

FIG. 2 shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1. For FDD, each subframe for the frequency channel used for the downlink may be referred to as a downlink subframe. Each subframe for the frequency channel used for the uplink may be referred to as an uplink subframe.

A downlink subframe may include a control region and a data region. The control region may include the first Q symbol periods of the downlink subframe, where Q may be equal to 1, 2 or 3 and may change from subframe to subframe. The data region may include remaining symbol periods of the downlink subframe.

Figure 3:
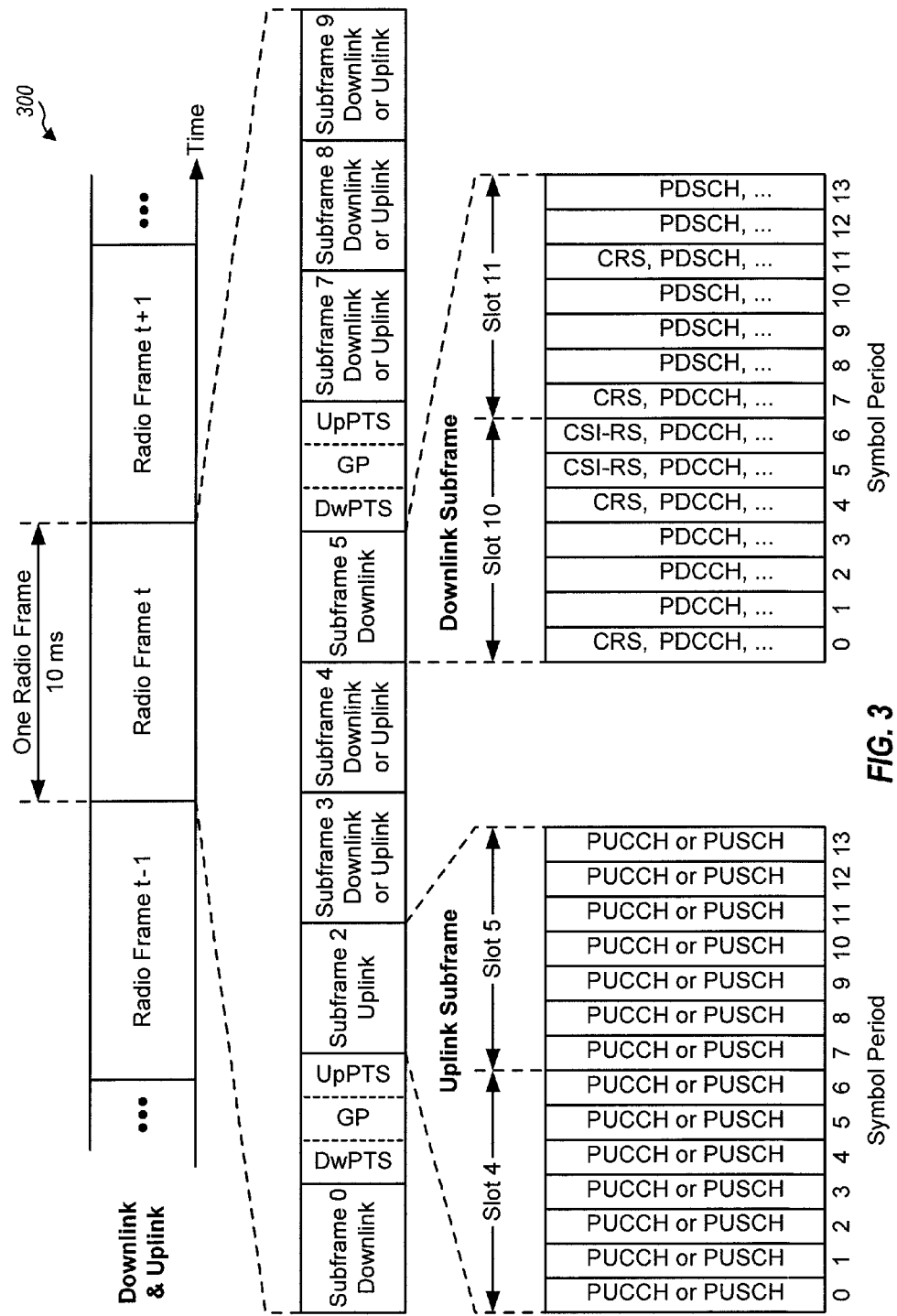
FIG. 3 shows an exemplary frame structure for TDD.

FIG. 3 shows an exemplary frame structure 300 for TDD in LTE. The transmission timeline for the downlink and uplink may be partitioned into units of radio frames, and each radio frame may be partitioned into 10 subframes with indices of 0 through 9. LTE supports a number of uplink-downlink configurations for TDD. Subframes 0 and 5 are used for the downlink and subframe 2 is used for the uplink for all uplink-downlink configurations. Subframes 3, 4, 7, 8 and 9 may each be used for the downlink or uplink depending on the uplink-downlink configuration. Subframe 1 includes three special fields composed of a Downlink Pilot Time Slot (DwPTS) used for downlink control channels as well as data transmission, a Guard Period (GP) of no transmission, and an Uplink Pilot Time Slot (UpPTS) used for either a random access channel (RACH) or sounding reference signals (SRS). Subframe 6 may include only the DwPTS, or all three special fields, or a downlink subframe depending on the uplink-downlink configuration. The DwPTS, GP and UpPTS may have different durations for different subframe configurations. For TDD, each subframe used for the downlink may be referred to as a downlink subframe, and each subframe used for the uplink may be referred to as an uplink subframe.

Table 1 lists seven exemplary uplink-downlink configurations available in an LTE network supporting TDD operation. Each uplink-downlink configuration indicates whether each subframe is a downlink subframe (denoted as "D" in Table 1), or an uplink subframe (denoted as "U" in Table 1), or a special subframe (denoted as "S" in Table 1). As shown in Table 1, uplink-downlink configurations 1 through 5 have more downlink subframes than uplink subframes in each radio frame.

TABLE 1

Uplink-Downlink Configurations for TDD

| Uplink-Downlink Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

For both FDD and TDD, a cell may transmit a Physical Downlink Control Channel (PDCCH), a Physical HARQ Indicator Channel (PHICH), and/or other physical channels in a control region of a downlink subframe. The PDCCH may carry downlink control information (DCI) such as downlink grants, uplink grants, etc. The PHICH may carry acknowledgement/negative acknowledgement (ACK/NAK) feedback for data transmission sent on the uplink with HARQ. The cell may also transmit a Physical Downlink Shared Channel (PDSCH) and/or other physical channels in a data region of a downlink subframe. The PDSCH may carry data for UEs scheduled for data transmission on the downlink and/or other information.

A cell may also transmit a cell-specific reference signal (CRS) in certain symbol periods of each downlink subframe. A reference signal is a signal that is known a priori by a transmitter and a receiver and may also be referred to as pilot. A CRS is a reference signal that is specific for a cell, e.g., generated based on a cell identity (ID). The cell may transmit a CRS from two antenna ports 0 and 1 in symbol periods 0, 4, 7 and 11 of each subframe with the normal cyclic prefix (e.g., as shown in FIGS. 2 and 3). The cell may also transmit the CRS from two additional antenna ports 2 and 3 in symbol periods 1 and 8 of each subframe with the normal cyclic prefix (not shown in FIGS. 2 and 3). The cell may transmit the CRS on evenly spaced subcarriers, which may be determined based on the cell ID.

A cell may also transmit a CSI reference signal (CSI-RS) in certain symbol periods of certain subframes. For example, the CSI-RS may be transmitted every 5 ms in subframes 0 and 5 of each radio frame. The CSI-RS may also be transmitted with other periodicity and/or in other subframes. The CSI-RS may be used for various purposes such as channel measurement, channel feedback reporting, etc.

For both FDD and TDD, a UE may transmit either a Physical Uplink Control Channel (PUCCH) in a control region of an uplink subframe or a Physical Uplink Shared Channel (PUSCH) in a data region of the uplink subframe. The PUCCH may carry uplink control information (UCI) such as CSI, scheduling request, etc. The PUSCH may carry data and/or UCI.

The various signals and channels in LTE are described in 3GPP TS 36.211, entitled "Evolved Universal Terrestrial Radio Access (E-UTRA); Physical Channels and Modulation," which is publicly available.

A wireless network may support transmission of data with HARQ in order to improve reliability. For HARQ, a transmitter (e.g., an eNB) may send an initial transmission of a packet of data and may send one or more additional transmissions of the packet, if needed, until the packet is decoded correctly by a receiver (e.g., a UE), or the maximum number of transmissions of the packet has occurred, or some other termination condition is encountered. A packet may also be referred to as a transport block, a codeword, etc. After each transmission of the packet, the receiver may decode all received transmissions of the packet to attempt to recover the packet. The receiver may send an ACK if the packet is decoded correctly or a NAK if the packet is decoded in error. The transmitter may send another transmission of the packet if a NAK is received and may terminate transmission of the packet if an ACK is received.

A specific HARQ timeline may be used for data transmission with HARQ. The HARQ timeline may indicate a specific subframe in which a grant is sent on the PDCCH, a specific subframe in which data transmission is sent on the PDSCH or PUSCH based on the grant, and a specific subframe in which ACK/NAK for the data transmission is sent on the PUCCH or PHICH. Different HARQ timelines may be used for FDD and TDD. A HARQ timeline for FDD may indicate that for a grant sent in subframe n, data transmission may be sent four subframes later in subframe n+4, and ACK/NAK may be sent four subframes later in subframe n+8.

For TDD, different HARQ timelines may be used for different uplink-downlink configurations and also for different subframes of a given uplink-downlink configuration. A HARQ timeline for TDD may indicate that for an uplink grant sent on the PDCCH in downlink subframe n, data transmission may be sent on the PUSCH in subframe n+k, where k≥4, and ACK/NAK may be sent on the PHICH in subframe n+q, where q≥8.

Table 2 lists the value of k for different downlink subframes in which uplink grants may be sent on the PDCCH for the seven uplink-downlink configurations shown in Table 1. As an example, for uplink-downlink configuration 0, an uplink grant may be sent on the PDCCH (i) in downlink subframe 0 to support data transmission on the PUSCH in uplink subframe 4 (with k=4) or (ii) in downlink subframe 1 to support data transmission on the PUSCH in uplink subframe 7 (with k=6). For uplink-downlink configurations 1 through 5, more downlink subframes are available to send control information than uplink subframes available to send data. Hence, some downlink subframes are not utilized to send uplink grants.

TABLE 2 k for Uplink-Downlink Configurations 0 to 6 for TDD

| Uplink-Downlink Configuration | Subframe Number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

A UE may estimate channel quality for an eNB and may determine CSI. CSI may include channel quality indicator (CQI), precoding matrix indicator (PMI), rank indicator (RI), and/or information. RI may indicate the number of layers (i.e., L layers, where L≥1) to use for data transmission. Each layer may be viewed as a spatial channel. PMI may indicate a precoding matrix or vector to use for precoding data prior to transmission. CQI may indicate a channel quality for each of at least one packet (e.g., P packets, where L≥P≥1) to send. CSI may also include other information used to transmit data.

A UE may report CSI based on periodic CSI reporting and/or aperiodic CSI reporting. For periodic CSI reporting, the UE may be configured (e.g., via Radio Resource Control (RRC) signaling) to periodically report CSI. The UE may then report CSI based on a schedule configured for the UE. For aperiodic CSI reporting, the UE may be requested, in any subframe, to send CSI via a CSI request included an uplink grant.

FIG. 4A shows aperiodic CSI reporting for FDD. An eNB may send an uplink grant on the PDCCH to a UE in subframe n. The uplink grant may include various parameters to use to generate and send a data transmission by the UE. The uplink grant may also include a CSI request. The UE may receive the uplink grant and the CSI request in subframe n. The UE may determine CSI based on the CRS, the CSI-RS, and/or other signals received from the eNB in subframe n. The UE may then send CSI along with data on the PUSCH to the eNB in subframe $n+n_{CQI\_ref}$ where $n_{CQI\_ref}=4$ for FDD in LTE Release 8 and $n_{CQI\_ref} \geq 4$ with cross-subframe scheduling.

FIG. 4B shows aperiodic CSI reporting for TDD. An eNB may send an uplink grant on the PDCCH to a UE in downlink subframe n. The uplink grant may include a CSI request. The UE may receive the uplink grant and the CSI request in downlink subframe n. The UE may determine CSI based on the CRS, the CSI-RS, and/or other signals received from the eNB in subframe n. The UE may then send CSI along with data on the PUSCH to the eNB in uplink subframe n+$n_{CQI\_ref}$ where $n_{CQI\_ref} \geq 4$ for TDD in LTE Release 8. $n_{CQI\_ref}$ may be dependent on both the uplink-downlink configuration and the specific downlink subframe n in which the CSI request is received. $n_{CQI\_ref}$ may be equal to k shown in Table 2.

The wireless network may support operation on multiple carriers, which may be referred to as carrier aggregation or multi-carrier operation. A UE may be configured with multiple carriers for the downlink and one or more carriers for the uplink for carrier aggregation. For FDD, a carrier may comprise one frequency channel for the downlink and another frequency channel for the uplink. For TDD, a carrier may comprise a single frequency channel used for both the downlink and uplink. A carrier configured for FDD may be referred to as an FDD carrier. A carrier configured for TDD may be referred to as a TDD carrier. An eNB may transmit data and control information on one or more carriers to a UE. The UE may transmit data and control information on one or more carriers to the eNB.

In LTE Release 10, a UE may be configured with up to five carriers for carrier aggregation. Each carrier may have a bandwidth of up to 20 MHz, and each carrier may be backward compatible with LTE Release 8. The UE may thus be configured with up to 100 MHz for up to five carriers. LTE Release 10 supports carrier aggregation for multiple carriers with the same system configuration. In particular, all carriers for carrier aggregation are configured for either FDD or TDD, and a mixture of FDD and TDD carriers is not allowed. Furthermore, if the carriers are configured for TDD, then all carriers have the same uplink-downlink configuration, although special subframes may be configured separately for different carriers. Restricting all carriers to have the same FDD or TDD configuration as well as the same uplink-downlink configuration may simplify operation. One carrier may be designated as a primary carrier. An eNB may transmit the PDCCH in a common search space on the primary carrier. A UE may transmit the PUCCH on the primary carrier.

Carrier aggregation in LTE Release 11 and/or later may support carriers with different configurations. For example, an aggregation of FDD and TDD carriers may be supported. As another example, an aggregation of carriers with different uplink-downlink configurations may be supported. The different uplink-downlink configurations for different carriers may be due to different uplink-downlink configurations for TDD, e.g., as shown in Table 1.

The different uplink-downlink configurations for different carriers may also be due to partitioning of downlink and uplink subframes to support operation of relays. For example, some of the 10 downlink subframes in each radio frame for an FDD carrier may be allocated for a backhaul downlink from an eNB to a relay, and the remaining downlink subframes in each radio frame for the FDD carrier may be allocated for an access downlink from the relay to UEs. Some of the 10 uplink subframes in each radio frame for the FDD carrier may be allocated for a backhaul uplink from the relay to the eNB, and the remaining uplink subframes in each radio frame for the FDD carrier may be allocated for an access uplink from the UEs to the relay. The downlink and uplink subframes may be allocated in different manners for different relays, which may then result in different uplink-downlink configurations for these relays.

The different uplink-downlink configurations for different carriers may also be due to allocation of downlink and uplink subframes to support home eNBs, pico eNBs, etc. For example, some of the 10 downlink subframes in each radio frame for an FDD carrier may be allocated to a home eNB, and the remaining downlink subframes in each radio frame for the FDD carrier may be allocated for a macro eNB. Some of the uplink subframes in each radio frame for the FDD carrier may be allocated to the home eNB, and the remaining uplink subframes in each radio frame for the FDD carrier may be allocated to the macro eNB.

Carriers with different configurations may thus be obtained in various manners. Supporting carriers with different configurations may provide more flexibility in deployment. Each carrier may be backward compatible to a single carrier in LTE Release 8, 9 or 10 in a single carrier mode. It may also be possible to support non-backward compatible carriers, e.g., carrier segments, extension carriers, etc.

FIG. 5A shows an exemplary deployment of two carriers with different FDD and TDD configurations. In this example, carrier 1 is configured for FDD and includes two frequency channels. One frequency channel is for the downlink and includes downlink subframes, which are denoted as "D" in FIG. 5A. The other frequency channel is for the uplink and includes uplink subframes, which are denoted as "U" in FIG. 5A. Carrier 2 is configured for TDD with uplink-downlink configuration 1. Subframes 0, 4, 5 and 9 of carrier 2 are downlink subframes, subframes 1 and 6 of carrier 2 are special subframes, and remaining subframes 2, 3, 7 and 8 of carrier 2 are uplink subframes.

FIG. 5B shows an exemplary deployment of two carriers with different uplink-downlink configurations for TDD. In this example, carrier 1 is configured for TDD with uplink-downlink configuration 0. Subframes 0 and 5 of carrier 1 are downlink subframes, subframes 1 and 6 of carrier 1 are special subframes, and remaining subframes 2 to 4 and 7 to 9 of carrier 1 are uplink subframes. Carrier 2 is configured for TDD with uplink-downlink configuration 1. Subframes 1, 4, 5 and 9 of carrier 2 are downlink subframes, subframes 1 and 6 of carrier 2 are special subframes, and remaining subframes 2, 3, 7 and 8 of carrier 2 are uplink subframes.

FIGS. 5A and 5B show two examples of carriers with different configurations. In general, any number of carriers may be supported. Different carriers may have different configurations due to different FDD/TDD configurations and/or different uplink-downlink configurations.

Aperiodic CSI reporting may be supported for carrier aggregation. In one design, a CSI request may include two bits that may be defined as shown in Table 3. The term "cell" in Table 3 refers to "carrier". The 2-bit CSI request may be included in an uplink grant to trigger aperiodic CSI reporting by a UE. The uplink grant may be sent using PDCCH DCI format 0 or 4 in a UE-specific search space. In another design, a CSI request may include a bitmap having one bit for each carrier configured for a UE. The bit for each carrier may indicate whether or not to report CSI for that carrier. A CSI request may also indicate one or more carriers to report CSI in other manners. In one design, a UE may receive at most one CSI request in a given subframe.

TABLE 3

CSI Request

| Value of CSI Request field | Description |
| --- | --- |
| '00' | No aperiodic CSI report is triggered. |
| '01' | Aperiodic CSI report is triggered for serving cell. |
| '10' | Aperiodic CSI report is triggered for a first set of serving cells configured by higher layers. |
| '11' | Aperiodic CSI report is triggered for a second set of serving cells configured by higher layers. |

An eNB may send a CSI request on the PDCCH on a carrier in a downlink subframe. A UE may send the requested CSI on the PUSCH on a carrier in an uplink subframe. Table 4 lists exemplary terminology of carriers and subframes applicable for aperiodic CSI reporting. A PDCCH carrier and a PUSCH carrier may be the same carrier with no cross-carrier signaling or may be different carriers with cross-carrier signaling.

TABLE 4

| Terminology | Description |
| --- | --- |
| PDCCH carrier | Carrier on which a CSI request is sent. |
| PDCCH subframe | Subframe in which a CSI request is sent. |
| Reference subframe | Subframe in which to measure at least one reference signal to determine CSI. |
| PUSCH carrier | Carrier on which CSI is reported/sent. |
| CSI reporting subframe | Subframe in which CSI is reported/sent. |

A UE may determine CSI for a carrier based on one or more reference signals received on the carrier from an eNB. The UE may measure channel response and interference based on one or more reference signals received in one or more subframes. In one design, the UE may measure both the channel response and interference based on a reference signal (e.g., the CRS) received in one subframe, which may be referred to as a reference subframe. In another design, the UE may measure the channel response based on one reference signal (e.g., the CSI-RS) received in one subframe (which may be referred to as a channel reference subframe) and may measure interference based on another reference signal (e.g., the CRS) received in the same subframe or a different subframe (which may be referred to as an interference reference subframe). The eNB may transmit the CRS in each downlink subframe and may transmit the CSI-RS with a particular periodicity. The UE may measure the channel response or interference based on the CRS received in the PDCCH subframe. The UE may measure the channel response based on the CSI-RS received in a subframe that is either the PDCCH subframe or closest to and earlier than the PDCCH subframe. For simplicity, much of the description below assumes a single reference subframe for each carrier, which may be a subframe in which the CRS is transmitted.

For aperiodic CSI reporting for one carrier, a reference subframe may correspond to downlink subframe $m-n_{CQI\_ref}$ where subframe m is the CSI reporting subframe. For aperiodic CSI reporting in response to a CSI request in an uplink grant, $n_{CQI\_ref}$ may be defined such that the reference subframe is the PDCCH subframe in which the CSI request is sent. For aperiodic CSI reporting in response to a CSI request in a Random Access Response (RAR) grant, $n_{CQI\_ref}$ may be equal to 4, and downlink subframe $m-n_{CQI\_ref}$ may correspond to a valid downlink subframe after the PDCCH subframe.

A UE may report CSI for a carrier in response to a CSI request if reference subframe $m-n_{CQI\_ref}$ is a valid downlink subframe. The UE may omit CSI reporting if reference subframe $m-n_{CQI\_ref}$ is not a valid downlink subframe. In one design, a downlink subframe may be considered to be valid for the UE if the following criteria are satisfied:

The subframe is configured as a downlink subframe for the UE,

The subframe is not a Multimedia Broadcast Single Frequency Network (MBSFN) subframe (except for transmission mode 9), The subframe does not contain a DwPTS field in case the length of DwPTS is $7680T_S$ or less, where $T_S$ is a base time unit of 1/3,072,000 seconds, and The subframe does not fall within a configured measurement gap for the UE.

A downlink subframe may also be considered to be valid based on other criteria.

For FDD, an uplink grant may be sent on the PDCCH 4 ms (or $n_{CQI\_ref}$=4 subframes) earlier than when data is transmitted on the PUSCH. Cross-subframe scheduling may be supported (e.g., in LTE Release 11 and later), and the difference/delay from the PDCCH subframe to the PUSCH subframe may be larger than 4 ms. For TDD, an uplink grant may be sent on the PDCCH at least 4 ms (or $n_{CQI\_ref}$≥4 subframes) earlier than when data is transmitted on the PUSCH.

An issue may arise when a CSI request is sent on one carrier in one downlink subframe to trigger aperiodic CSI reporting for multiple carriers. These multiple carriers may have different configurations (e.g., FDD and TDD and/or different uplink-downlink configurations). The multiple carriers may have different subframes available for making measurements for CSI and/or different subframes available for sending CSI. This may complicate measurement and reporting of CSI for multiple carriers. For example, there may be ambiguity as to which downlink subframe should be used as a reference subframe for each carrier. This ambiguity may be addressed in various manners.

In a first technique, a common reference subframe may be determined based on a PDCCH subframe in which a CSI request is received and may be utilized in determining CSI for all carriers. This common reference subframe may be defined in different manners depending on whether the CSI request is received on an FDD carrier or a TDD carrier.

If the CSI request is received on an FDD carrier in downlink subframe n for CSI reporting in subframe m=n+4, then $n_{CQI\_ref}$ may be equal to 4 (or a value greater than 4 if cross-subframe scheduling is supported, i.e., m>n+4). In one design, the reference subframe for all carriers may be downlink subframe n. In another design, the reference subframe may be (i) any downlink subframe between subframe n and subframe $n+n_{CQI\_ref}-4$, where $n_{CQI\_ref}$≥4, or (ii) a subframe later than subframe $n+n_{CQI\_ref}-4$ (e.g., if a smaller measurement delay is supported). For each FDD carrier, the reference subframe defined based on the PDCCH subframe would be a valid downlink subframe. CSI may be determined for each FDD carrier based on one or more reference signals received on that FDD carrier in the reference subframe. For each TDD carrier, the reference subframe defined based on the PDCCH subframe may or may not be a valid downlink subframe. For example, the reference subframe may correspond to an uplink subframe for a TDD carrier. CSI may be determined for each TDD carrier for which the reference subframe is a valid downlink subframe. CSI may be omitted for each TDD carrier for which the reference subframe is not a valid downlink subframe. Alternatively, CSI for all carriers (or just all TDD carriers) may be omitted if the reference subframe is not a valid subframe for any TDD carrier. In any case, CSI for all carriers may be reported in uplink subframe m, which may be the PUSCH subframe as well as the CSI reporting subframe.

If the CSI request is received on a TDD carrier in downlink subframe n for CSI reporting in subframe m=n+k, where k depends on the uplink-downlink configuration of the TDD carrier and the particular downlink subframe in which the CSI request is received, and $n_{CQI\_ref}$=k≥4. For each FDD carrier, the reference subframe defined based on the PDCCH subframe would be a valid downlink subframe. CSI may be determined for each FDD carrier based on one or more reference signals received on that FDD carrier in the reference subframe. For each TDD carrier on which the CSI request was not received, the reference subframe defined based on the PDCCH subframe may or may not be a valid downlink subframe. CSI may be determined for each TDD carrier for which the reference subframe is a valid downlink subframe. CSI may be omitted for each TDD carrier for which the reference subframe is not a valid downlink subframe. CSI for all carriers may be reported in uplink subframe m, which may be the PUSCH subframe as well as the CSI reporting subframe. If $n_{CQI\_ref}$>4, then the reference subframe may be earlier than necessary for each FDD carrier and also for each TDD carrier with a shorter HARQ timing delay.

Figure 6A:
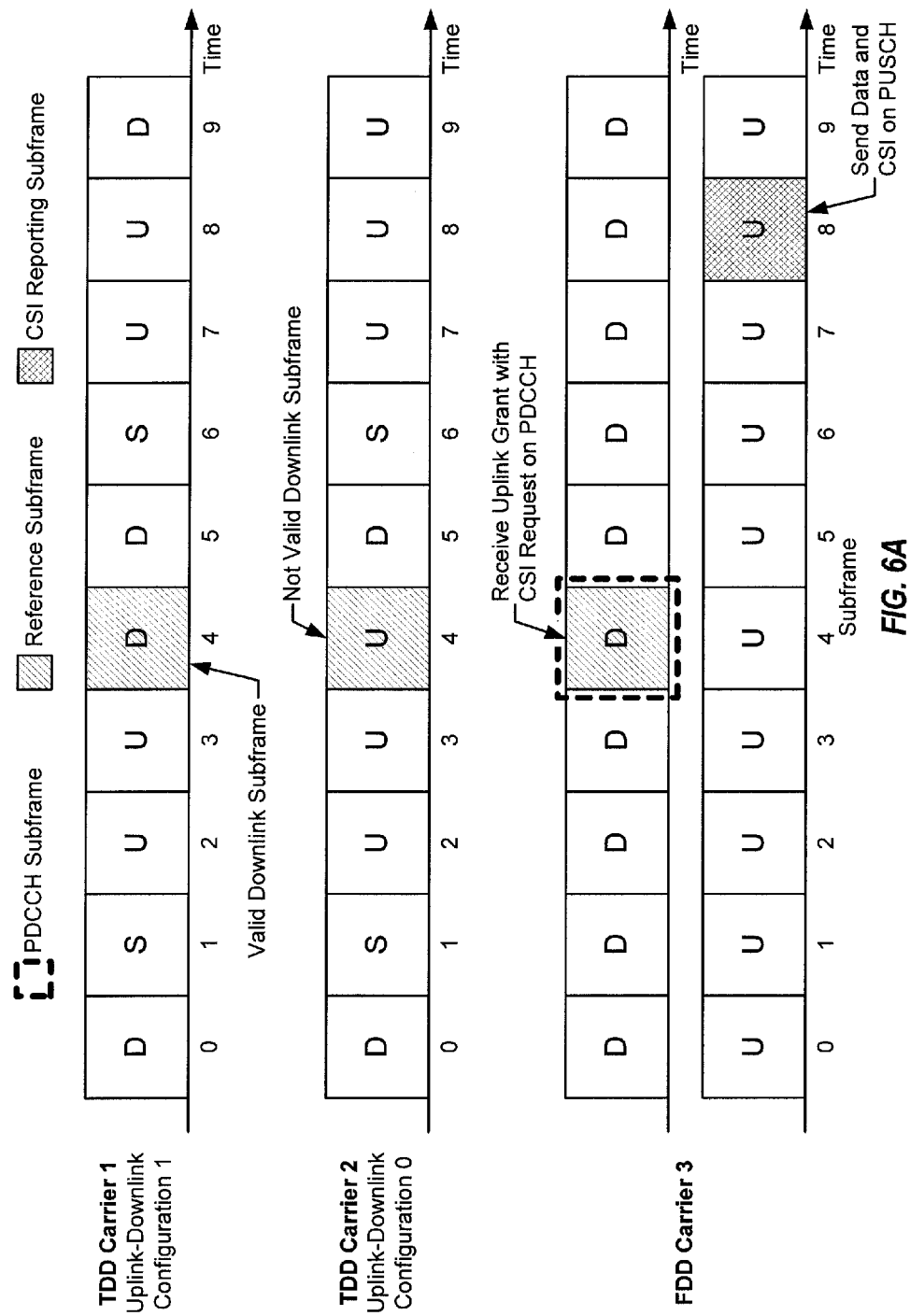
FIGS. 6A and 6B show two examples of determining a single reference subframe for multiple carriers with different configurations based on a first technique.

FIG. 6A shows an example of determining a single reference subframe for multiple carriers with different configurations based on the first technique described above. In this example, a UE receives a CSI request for three carriers 1, 2 and 3. Carrier 1 is configured for TDD with uplink-downlink configuration 1. Carrier 2 is configured for TDD with uplink-downlink configuration 0. Carrier 3 is configured for FDD. The CSI request is received on the PDCCH on FDD carrier 3 in subframe 4, which is the reference subframe for all three carriers. This reference subframe is a valid downlink subframe for TDD carrier 1 but is not a valid downlink subframe for TDD carrier 2. The UE may determine CSI for carriers 1 and 3 based on reference signals received on carriers 1 and 3 in the reference subframe. Since $n_{CQI\_ref}$=4 for FDD carrier 3, the UE may send the CSI for carriers 1 and 3 in uplink subframe 8. The UE may omit CSI for TDD carrier 2 since the reference subframe is not a valid downlink subframe for this carrier.

Figure 6B:
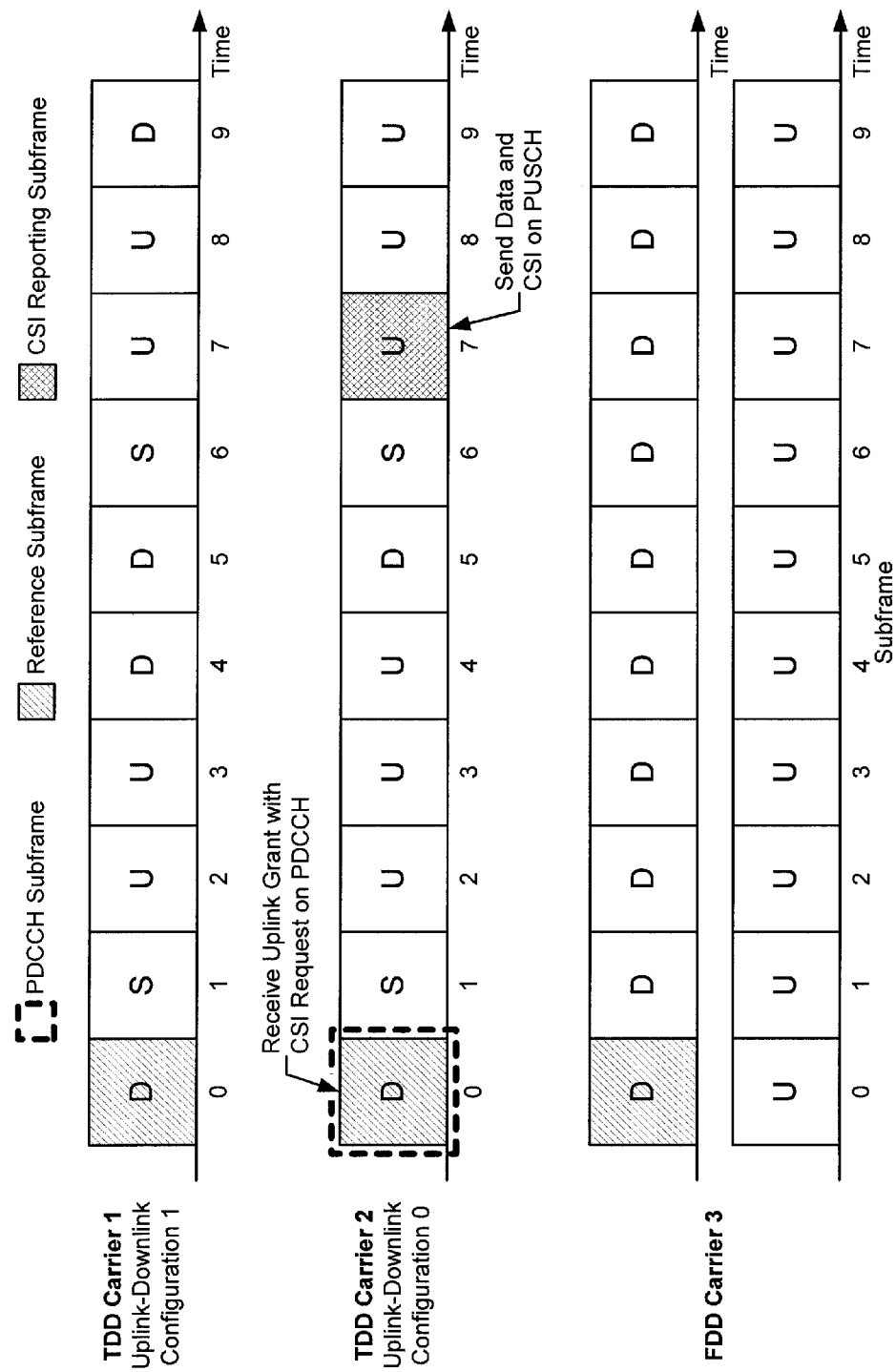

FIG. 6B shows another example of determining a single reference subframe for multiple carriers with different configurations based on the first technique. In this example, a UE receives a CSI request for three carriers 1, 2 and 3, which are configured as described above for FIG. 6A. The CSI request is received on the PDCCH on TDD carrier 2 in subframe 0, which is the reference subframe for all three carriers. This reference subframe is a valid downlink subframe for all three carriers. The UE may determine CSI for all three carriers based on reference signals received on these carriers in the reference subframe. Since $n_{CQI\_ref}$=7 for TDD carrier 2 in subframe 0, the UE may send the CSI for the three carriers in uplink subframe 7. This example shows the reference subframe being early for carriers 1 and 3 due to $n_{CQI\_ref}$ being equal to 7 for TDD carrier 2 in subframe 0.

Figure 7:
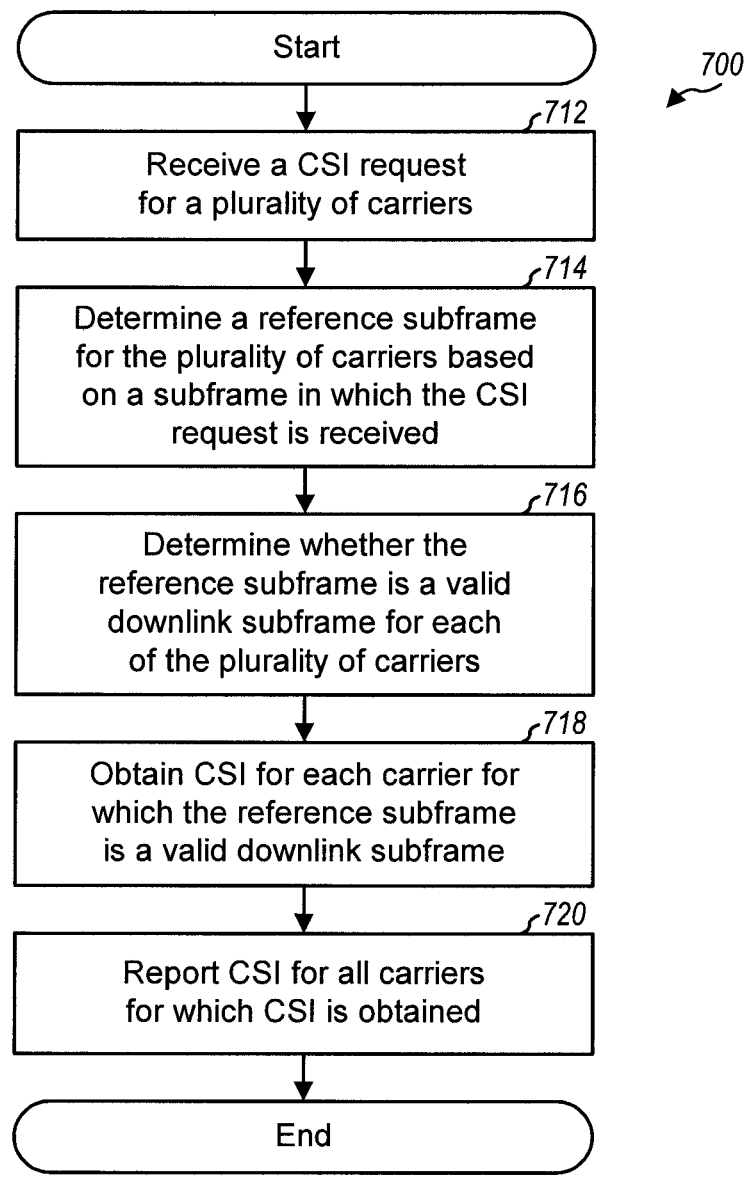
FIG. 7 shows a process for reporting CSI based on the first technique.

FIG. 7 shows a design of a process 700 for reporting CSI based on the first technique. A UE may receive a CSI request for a plurality of carriers (block 712). The plurality of carriers may include carriers with different configurations that are configured for use by the UE. The UE may determine a common reference subframe for the plurality of carriers based on a subframe in which the CSI request is received (block 714). The UE may determine whether the reference subframe is a valid downlink subframe for each of the plurality of carriers (block 716). The UE may obtain CSI based on reference signals received in the common reference subframe for each carrier for which the reference subframe is determined to be a valid downlink subframe (block 718). The UE may report CSI for all carriers for which CSI is obtained, e.g., all carriers for which the reference subframe is a valid downlink subframe (block 720).

In a second technique, a reference subframe may be determined separately for each carrier, and different reference subframes may be applicable for different carriers depending on their configurations. The reference subframe for each carrier may be determined based on a CSI reporting subframe as well as the configuration and the HARQ timeline of that carrier.

For example, a UE may receive a CSI request on a given carrier X in downlink subframe n, and the reference subframe for carrier X may be downlink subframe n. The UE may report CSI for all carriers in uplink subframe m, where m=n+ $n_{CQI\_ref}$ and $n_{CQI\_ref}$ is dependent on the configuration of carrier X (and possibly subframe n if carrier X is configured for TDD). The UE may determine $n_{CQI\_ref}$ for each remaining carrier based on CSI reporting subframe m. $n_{CQI\_ref}$ may be equal to 4 for each FDD carrier and may be equal to 4 or some other value for each TDD carrier. The UE may determine the reference subframe for each carrier as subframe m−$n_{CQI\_ref}$, where $n_{CQI\_ref}$ may be determined separately for each carrier and may be different for different carriers.

With the second technique, $n_{CQI\_ref}$ may be determined for each carrier as if the CSI request was sent on that carrier, regardless of the actual carrier on which the CSI request is sent. Hence, if CSI for carrier Y is requested, then $n_{CQI\_ref}$ may be defined for carrier Y based on the HARQ timeline of carrier Y, regardless of the actual PDCCH carrier.

Table 5 shows a design of determining $n_{CQI\_ref}$ for each carrier for which CSI is requested. In the design shown in Table 5, $n_{CQI\_ref}$ for each FDD carrier may be defined based on the HARQ timeline for FDD and may be equal to four if cross-subframe scheduling is not supported. $n_{CQI\_ref}$ for each TDD carrier may be defined based on the HARQ timeline for TDD, which may be dependent on the uplink-downlink configuration for that TDD carrier and the CSI reporting subframe. $n_{CQI\_ref}$ for each carrier may be independent of whether the PDCCH carrier is configured for FDD or TDD.

TABLE 5

| PUSCH Carrier | CSI for FDD Carrier | CSI for TDD Carrier |
|---|---|---|
| FDD | $n_{CQI\_ref}$ follows FDD definition | $n_{CQI\_ref}$ follows TDD definition |
| TDD | $n_{CQI\_ref}$ follows FDD definition | $n_{CQI\_ref}$ follows TDD definition |

Figure 8A:
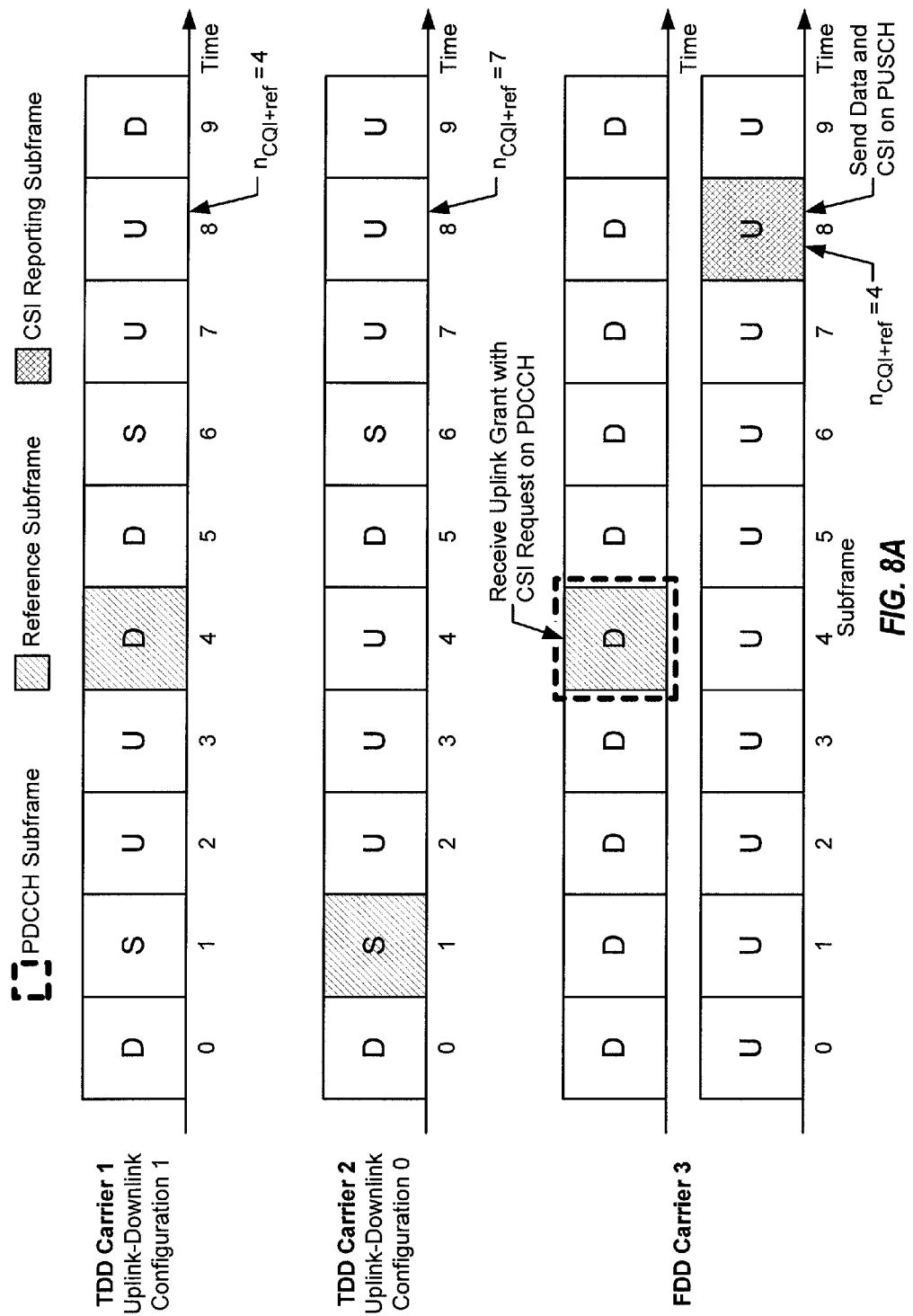
FIGS. 8A and 8B show two examples of determining a reference subframe for each carrier based on a second technique.

FIG. 8A shows an example of determining a separate reference subframe for each carrier based on the second technique described above. In this example, a UE receives a CSI request for three carriers 1, 2 and 3, which are configured as described above for FIG. 6A. The CSI request is received on the PDCCH on FDD carrier 3 in subframe 4. Since $n_{CQI\_ref}$=4 for FDD carrier 3, the UE may send CSI for all carriers in uplink subframe 8, which is the CSI reporting subframe. For TDD carrier 1, $n_{CQI\_ref}$=4 for uplink subframe 8, and the reference subframe for TDD carrier 1 is downlink subframe 4. For TDD carrier 2, $n_{CQI\_ref}$=7 for uplink subframe 8, and the reference subframe for TDD carrier 2 is downlink subframe 1. The UE may determine CSI for carriers 1 and 3 based on one or more reference signals received on carriers 1 and 3 in downlink subframe 4. The UE may determine CSI for carrier 2 based on one or more reference signals received on carrier 2 in downlink subframe 1. The UE may send the CSI for all three carriers in uplink subframe 8.

Figure 8B:
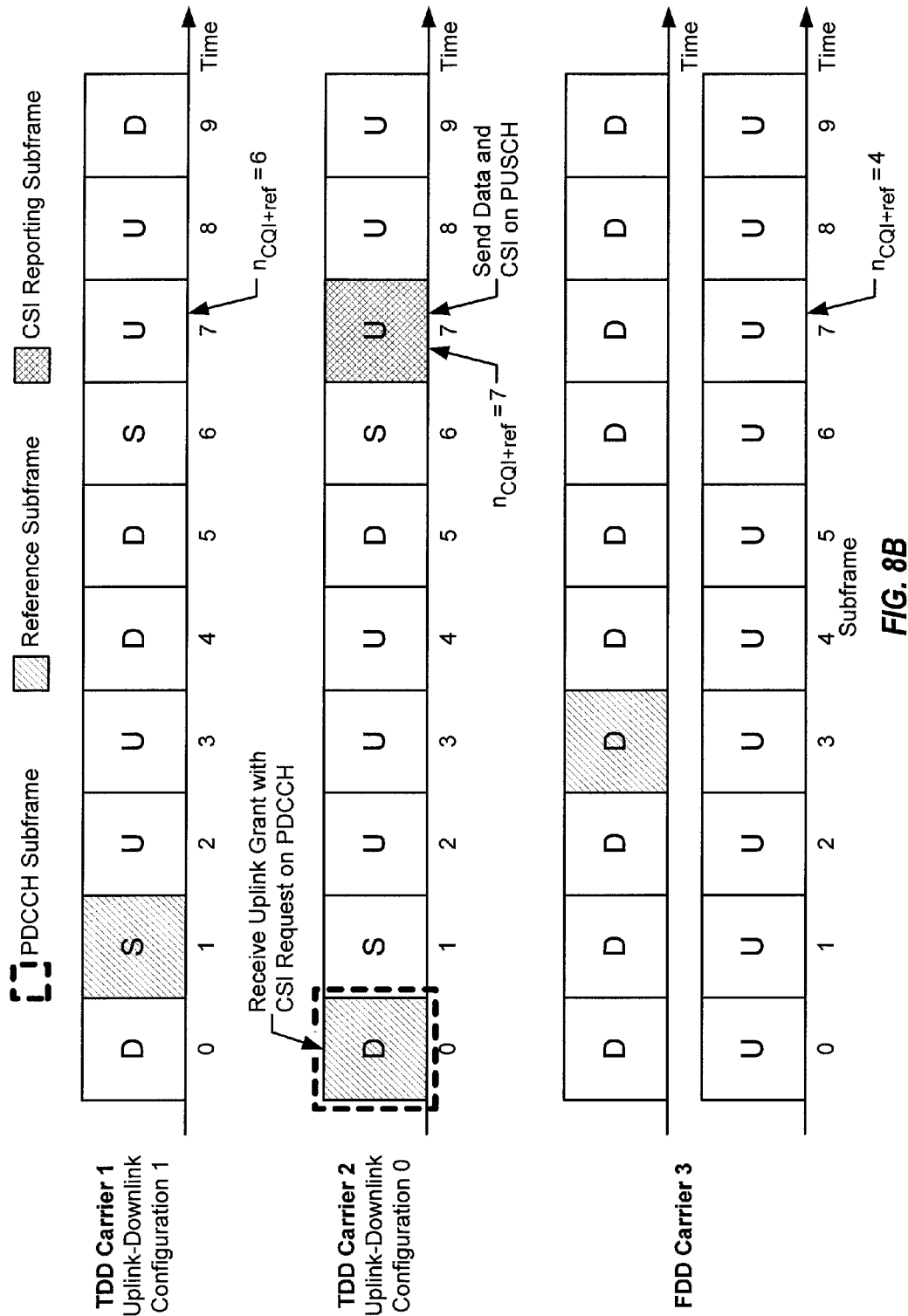

FIG. 8B shows another example of determining a reference subframe for each carrier based on the second technique. In this example, a UE receives a CSI request for three carriers 1, 2 and 3, which are configured as described above for FIG. 6A. The CSI request is received on the PDCCH on TDD carrier 2 in subframe 0. Since $n_{CQI\_ref}=7$ for TDD carrier 2 in subframe 0, the UE may send CSI for all three carriers in uplink subframe 7, which is the CSI reporting subframe. For TDD carrier 1, $n_{CQI\_ref}=6$ for uplink subframe 7, and the reference subframe for TDD carrier 1 is downlink subframe 1. For FDD carrier 3, $n_{CQI\_ref}=4$, and the reference subframe for FDD carrier 3 is downlink subframe 3. The UE may determine CSI for carriers 1, 2 and 3 based on one or more reference signals received on these carriers in downlink subframes 1, 0 and 3, respectively. The UE may send the CSI for all three carriers in uplink subframe 7.

As shown in FIG. 8A, a reference subframe for a carrier (e.g., TDD carrier 2) may occur earlier than the PDCCH subframe. This may be the case if a CSI request is sent on an FDD carrier and requests CSI for a TDD carrier, as shown in FIG. 8A. In one design, a UE may buffer a received signal for a sufficient number of downlink subframes (e.g., three or four downlink subframes) to enable the UE to make measurements for a reference subframe that is prior to the PDCCH subframe. The number of downlink subframes to buffer may be determined based on the HARQ timing relationship between FDD and TDD and also between different uplink-downlink configurations.

Buffering of downlink subframes to support measurements for CSI may be avoided in various manners. In one design, CSI may be omitted for each carrier for which the reference subframe is earlier than the PDCCH subframe. In another design, the reference subframe for each carrier may be restricted to be no earlier than the PDCCH subframe. The reference subframe may also be less than four subframes earlier than the CSI reporting subframe if a measurement delay of less than 4 ms is supported.

Table 6 shows another design of determining $n_{CQI\_ref}$ for each carrier for which CSI is requested. The design in Table 6 is similar to the design in Table 5 except for the case in which a CSI request is sent on an FDD carrier and requests CSI for a TDD carrier. In this case, $n_{CQI\_ref}$ for the TDD carrier may be defined based on the HARQ timeline for FDD (instead of TDD). This may prevent the reference subframe for the TDD carrier being earlier than the PDCCH subframe.

TABLE 6

| PUSCH Carrier | CSI for FDD Carrier | CSI for TDD Carrier |
| --- | --- | --- |
| FDD | $n_{CQI\_ref}$ follows FDD definition | $n_{CQI\_ref}$ follows FDD definition |
| TDD | $n_{CQI\_ref}$ follows FDD definition | $n_{CQI\_ref}$ follows TDD definition |

With the second technique, the reference subframe and $n_{CQI\_ref}$ for each carrier may be determined based on the CSI reporting subframe, which may be determined based on the PDCCH carrier and the PDCCH subframe. The CSI reporting subframe may not be an uplink subframe for a carrier for which CSI is requested. For example, referring to FIG. 8A, a CSI request may be received on FDD carrier 3 in subframe 1, and the CSI reporting subframe may be subframe 5. However, subframe 5 is a downlink subframe for both TDD carriers 1 and 2, and $n_{CQI\_ref}$ may not be defined for subframe 5. A TDD carrier for which the CSI reporting subframe is not an uplink subframe may be referred to as an "undefined TDD carrier." An undefined TDD carrier may be addressed in various manners. In one design, the reference subframe for an undefined TDD carrier may be determined based on $n_{CQI\_ref}$ of an uplink subframe that is closest to, and earlier than, the CSI reporting subframe. For the example described above, the reference subframe for TDD carriers 1 and 2 may be determined based on the $n_{CQI\_ref}$ for uplink subframes 3 and 4, respectively, which are closest to CSI reporting subframe 5. In another design, the reference subframe may be the latest downlink subframe that is at least four subframes earlier than the CSI reporting subframe. For the example described above, the reference subframe for TDD carriers 1 and 2 may be downlink subframe 0, which is five subframes earlier than CSI reporting subframe 5.

Figure 9:
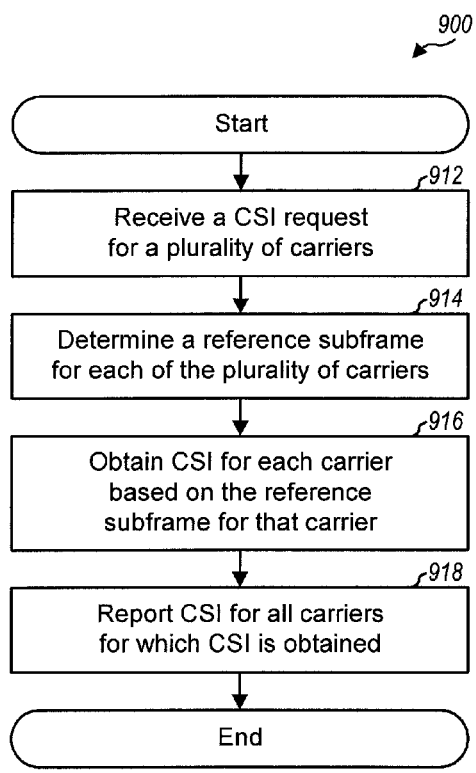
FIG. 9 shows a process for reporting CSI based on the second technique.

FIG. 9 shows a design of a process 900 for reporting CSI for a plurality of carriers having separate reference subframes according to the second technique. A UE may receive a single CSI request that is applicable to the plurality of carriers (block 912). The UE may determine a reference subframe for each of the plurality of carriers based a subframe in which the CSI request is received, the configuration of a carrier on which the CSI request is received, the configuration of the carrier for which CSI is requested, and/or other information (block 914). The UE may obtain CSI for each carrier based on reference signals received in the reference subframe for that carrier (block 916). The UE may report CSI for all carriers for which CSI is obtained, e.g., carriers for which their reference subframes are valid downlink subframes (block 918).

In a third technique, CSI may be requested and reported for carriers with the same $n_{CQI\_ref}$ and may be omitted for other carriers with a different $n_{CQI\_ref}$. With the third technique, carriers with the same $n_{CQI\_ref}$ have the same reference subframe as well as the same CSI reporting subframe. This may ensure that measurements can be made in a PDCCH subframe for all carriers and that CSI for all carriers can be sent in a CSI reporting subframe. A UE may receive a CSI request on a given carrier X in downlink subframe n and may determine $n_{CQI\_ref}$ based on carrier X and possibly subframe n if carrier X is configured for TDD. The UE may determine and report CSI for each carrier for which $n_{CQI\_ref}$ is the same as that of carrier X. In one design, Layer 3 (e.g., RRC) configuration may allow cross-carrier CSI request only if $n_{CQI\_ref}$ of the carriers for which CSI is requested matches $n_{CQI\_ref}$ of the carrier on which the CSI request is sent.

In one design, whether multiple carriers have the same $n_{CQI\_ref}$ may be defined for all subframes. For example, there may be four carriers for which CSI may be requested, with two carriers configured for FDD, and the other two carriers configured for TDD with the same uplink-downlink configuration. If the two TDD carriers have uplink-downlink configuration 0, 1, or 6, then CSI may be requested and reported for only the two FDD carriers, or only the two TDD carriers, but not a combination of FDD and TDD carriers. If the two TDD carriers have uplink-downlink configuration 2, 3, 4, or 5, then CSI may be requested and reported for all four carriers or any combination of these carriers.

In another design, whether multiple carriers have the same $n_{CQI\_ref}$ may be defined for each subframe. For uplink-downlink configurations 0, 1 and 6, $n_{CQI\_ref}$ may be equal to 4 for some subframes. CSI may then be requested and reported for FDD carriers as well as TDD carriers with uplink-downlink configurations 0, 1 and 6 in subframes in which $n_{CQI\_ref}$ for the TDD carriers is equal to 4. CSI may be requested and reported for only the FDD carriers, or only the TDD carriers, in subframes in which $n_{CQI\_ref}$ for the TDD carriers is not equal to 4.

In another design, CSI may be requested and reported for carriers of the same configuration. For example, CSI may be requested for only FDD carriers, or only TDD carriers with the same uplink-downlink configurations. CSI may not be requested for a combination of FDD and TDD carriers, or a combination of TDD carriers with different uplink-carrier configurations. This design may simplify operation.

Figure 10:
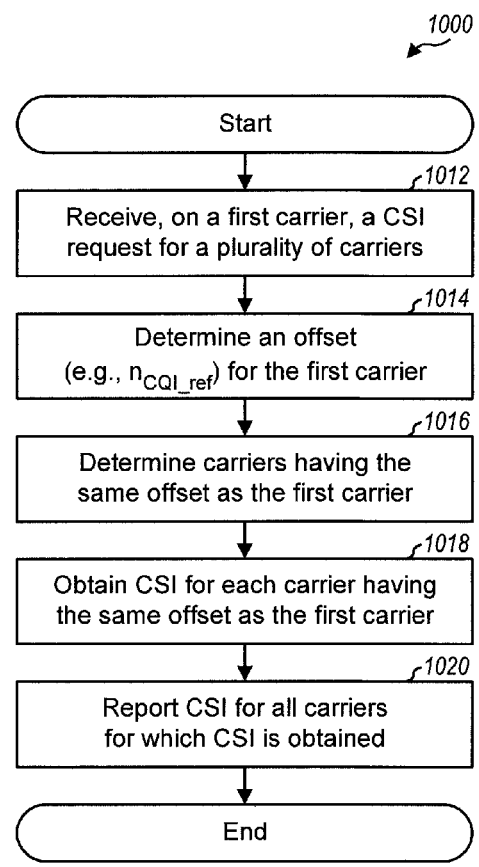
FIG. 10 shows a process for reporting CSI based on a third technique.

FIG. 10 shows a design of a process 1000 for reporting CSI based on the third technique. A UE may receive, on a first carrier, a CSI request for a plurality of carriers (block 1012). The UE may determine an offset (e.g., $n_{CQI\_ref}$) for the first carrier based on various factors such as the FDD or TDD configuration of the first carrier, a subframe in which the CSI request is received, a HARQ timeline for the first carrier, etc. (block 1014). The UE may determine additional carriers having the same offset as the first carrier (block 1016). The UE may obtain CSI for each carrier having the same offset as the first carrier (block 1018). In one design, the UE may determine a reference subframe and a CSI reporting subframe based on the offset and the subframe in which the CSI request is received. The UE may then determine CSI for each carrier having the same offset as the first carrier and for which the reference subframe is a valid downlink subframe. The UE may then report CSI for all carriers for which CSI is obtained (e.g., carriers for which the reference subframe is a valid downlink subframe) in the CSI reporting subframe (block 1020).

For clarity, aperiodic CSI reporting for multiple carriers having different configurations has been described in detail above. The techniques described herein may also be used for periodic CSI reporting for multiple carriers having different configurations. In general, CSI may be requested for any number of carriers based on a CSI request or a periodic CSI reporting configuration. One or more reference subframes may be determined for the carriers based on any of the designs described above.

Figure 11:
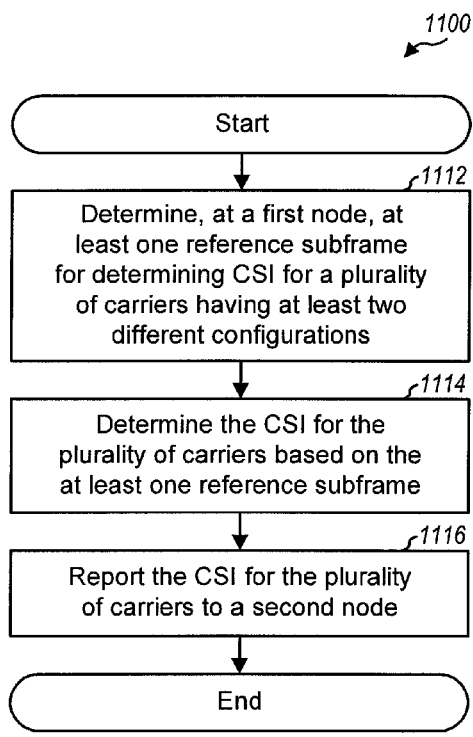
FIGS. 11 and 12 show processes for respectively reporting and receiving CSI for multiple carriers with different configurations.

FIG. 11 shows a design of a process 1100 for reporting CSI for multiple carriers with different configurations. Process 1100 may be performed by a first node, which may be a UE, a relay, a base station/eNB, or some other entity. The first node may determine at least one reference subframe for determining CSI for a plurality of carriers having at least two different configurations (block 1112). The first node may determine the CSI for the plurality of carriers based on the at least one reference subframe (block 1114). The first node may report the CSI for the plurality of carriers to a second node, which may be a base station, a relay, or some other entity (block 1116).

The different configurations of the plurality of carriers may be obtained in various manners. In one design, the plurality of carriers may comprise at least one carrier configured for FDD and at least one other carrier configured for TDD. In another design, the plurality of carriers may comprise a first carrier having a first uplink-downlink configuration and a second carrier having a second uplink-downlink configuration. The first and second carriers may be configured for TDD. Alternatively, the first and second carriers may be configured with different uplink-downlink partitioning to support half-duplex operation, relays, home eNBs, pico eNBs, etc.

In one design, for aperiodic CSI reporting, the first node may receive a CSI request for the plurality of carriers and may determine and report the CSI for the plurality of carriers in response to the CSI request. In another design, for periodic CSI reporting, the first node may determine and report the CSI for the plurality of carriers based on a configuration for periodic reporting of CSI by the first node. In one design, the first node may determine the plurality of carriers based on a current carrier aggregation configuration of the first node. In another design, the first node may determine the plurality of carriers based on signaling, e.g., the CSI request.

In one design, the first node may determine a single reference subframe for all of the plurality of carriers, e.g., based on the first technique or the third technique as described above. The first node may determine the CSI for the plurality of carriers based on this single reference subframe. In one design, the first node may receive a CSI request for the plurality of carriers in a first subframe and may determine the single reference subframe based on the first subframe, e.g., as described above for the first technique. For example, the reference subframe may be the first subframe. The first node may determine whether the reference subframe is a valid downlink subframe for each of the plurality of carriers and may determine and report CSI for each carrier for which the reference subframe is a valid downlink subframe. The reference subframe may not be a valid downlink subframe for a carrier if the reference subframe is not a downlink subframe for the carrier, or is an MBSFN subframe for the carrier, or is a special subframe with three symbols or less, or is part of a measurement gap for the first node, etc. In another design, the first node may determine the single reference subframe based on a second subframe in which the CSI for the plurality of carriers is reported and an offset that is the same for the plurality of carriers, e.g., as described above for the third technique. The offset may be variable and dependent on the first subframe in which the CSI request is received.

In another design, the first node may determine a reference subframe for each carrier, e.g., based on the second technique described above. The first node may receive a CSI request for the plurality of carriers in the first subframe and may determine the reference subframe for each of the plurality of carriers based on the first subframe. For example, the first node may determine the second subframe in which to report the CSI for the plurality of carriers based on the first subframe and a HARQ timeline of the carrier on which the CSI request is received. The first node may then determine the reference subframe for each carrier based on the second subframe and a HARQ timeline of that carrier. The reference subframe for each carrier may also be restricted to be the first subframe or a subframe later than the first subframe. The first node may determine CSI for each carrier based on the reference subframe for that carrier.

In one design of block 1114, the first node may determine the CSI for the plurality of carriers based on at least one reference signal received in the at least one reference subframe. The at least one reference signal may comprise a CRS, a CSI-RS, some other signal, or a combination thereof.

Figure 12:
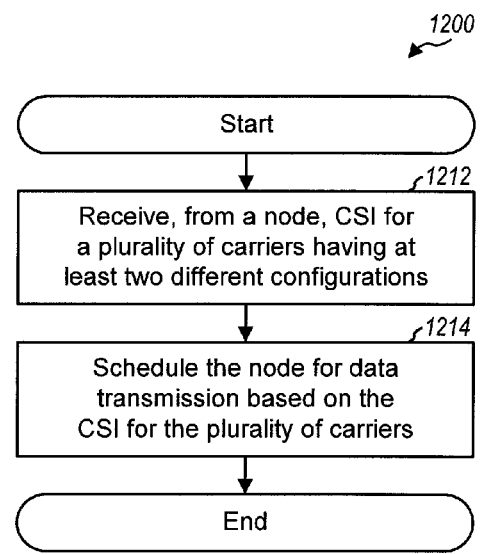

FIG. 12 shows a design of a process 1200 for receiving CSI for multiple carriers with different configurations. Process 1200 may be performed by a base station/eNB, a UE, a relay, or some other entity. CSI for a plurality of carriers having at least two different configurations may be received from a node (block 1212). The plurality of carriers may comprise FDD and TDD carriers and/or carriers with different uplink-downlink configurations. The node may be scheduled for data transmission based on the CSI for the plurality of carriers (block 1214).

In one design, for aperiodic CSI reporting, a CSI request for the plurality of carriers may be sent to the node. The node may determine and report the CSI for the plurality of carriers in response to the CSI request. In another design, for periodic CSI reporting, a configuration for periodic reporting of CSI may be sent to the node. The node may determine and report the CSI for the plurality of carriers based on the configuration for periodic reporting of CSI.

A CSI request for the plurality of carriers may be sent in a first subframe to the node. In one design, the CSI for the plurality of carriers may be determined and reported by the node based on a single reference subframe, which may be determined based on the first subframe. For example, the reference subframe may be the first subframe. The CSI for the plurality of carriers may include CSI for each carrier for which the reference subframe is a valid downlink subframe. In another design, a reference subframe may be determined for each carrier based on the first subframe and a HARQ timeline for the carrier. The reference subframe for each carrier may be the first subframe or another subframe and may be restricted to a subframe not earlier than the first subframe to avoid buffering at the node. CSI for each carrier may be determined by the node based on the reference subframe for that carrier. In yet another design, the plurality of carriers may have the same offset between the first subframe in which the CSI request is sent and a second subframe in which the CSI is reported. The offset may be variable and dependent on the first subframe.

Figure 13:
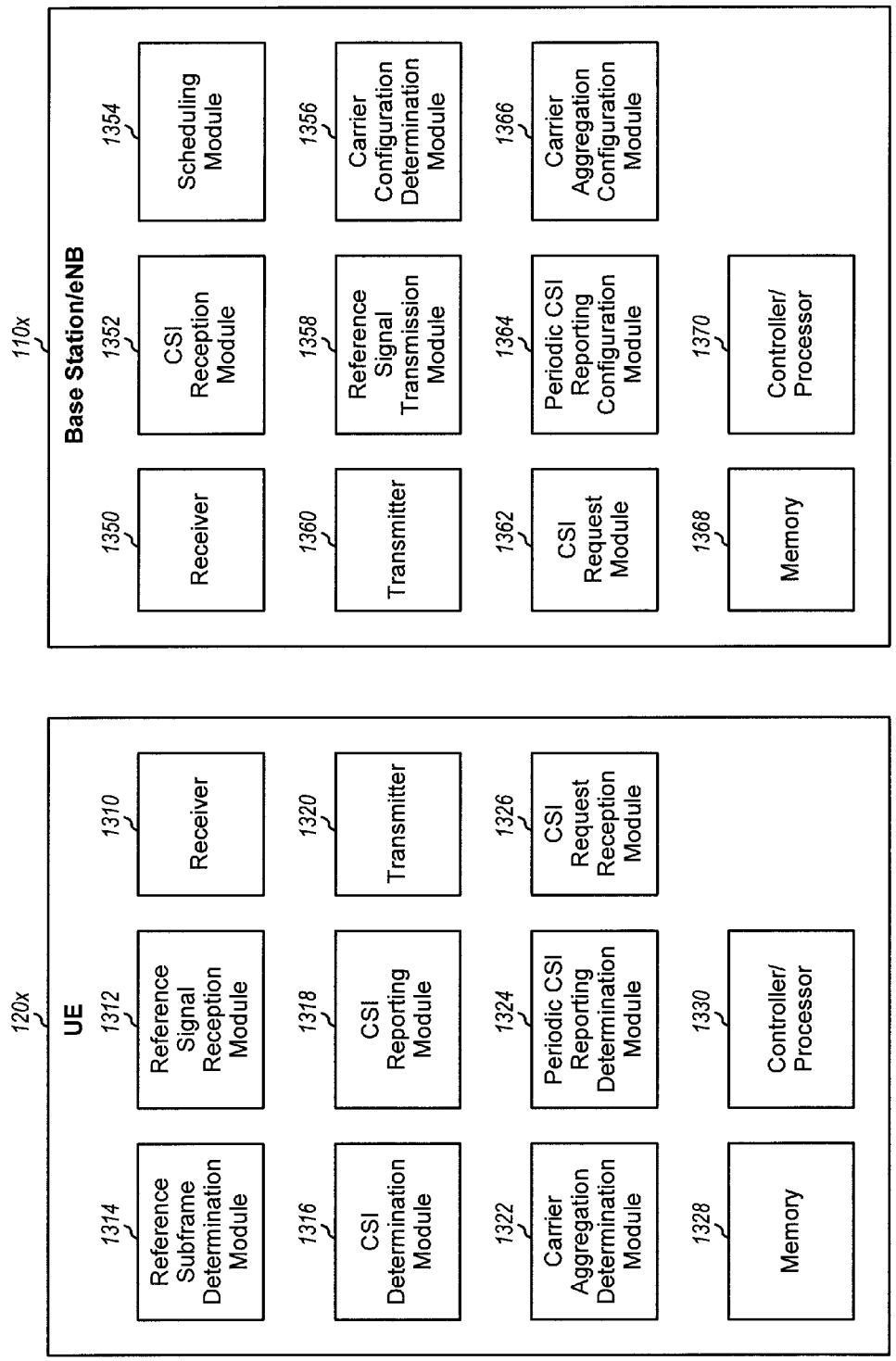
FIG. 13 shows a block diagram of a base station and a UE.

FIG. 13 shows a block diagram of a design of a UE 120*x* and a base station/eNB 110*x*, which may be one of the UEs and one of the eNBs in FIG. 1. Within UE 120*x*, a receiver 1310 may receive signals transmitted by base stations, relays, etc. A module 1314 may determine one or more reference subframes for a plurality of carriers configured for UE 120*x*. A module 1312 may receive reference signals (e.g., CRS, CSI-RS, etc.) in the reference subframes and may make measurements based on the reference signals. A module 1316 may determine CSI for the plurality of carriers based on the measurements from module 1312. A module 1318 may report the CSI for the plurality of carriers. A transmitter 1320 may transmit the CSI as well as other information. A module 1322 may determine the plurality of carriers configured for UE 120*x* for carrier aggregation. A module 1324 may determine a periodic CSI reporting configuration (if any) for UE 120*x*. A module 1326 may receive CSI requests sent to UE 120*x*, e.g., via uplink grants. Modules 1312 to 1318 may operate based on the CSI requests and/or the periodic CSI reporting configuration for UE 120*x*. The various modules within UE 120*x* may operate as described above. A controller/processor 1330 may direct the operation of various modules within UE 120*x*. A memory 1328 may store data and program codes for UE 120*x*.

Within base station 110*x*, a receiver 1350 may receive signals transmitted by UE 120*x* and other UEs. A module 1352 may receive messages from UE 120*x* and obtain CSI for the plurality of carriers configured for UE 120*x*. A module 1354 may schedule UE 120*x* for data transmission based on the CSI. A module 1356 may determine the configuration of each carrier supported by base station 110*x*. A module 1358 may generate reference signals. A transmitter 1360 may transmit the reference signals, data, and/or other information. A module 1366 may determine the plurality of carriers configured for UE 120*x* for carrier aggregation. A module 1364 may determine a periodic CSI reporting configuration (if any) for UE 120*x*. A module 1362 may send CSI requests to UE 120*x*, e.g., via uplink grants. The various modules within base station 110*x* may operate as described above. A controller/processor 1370 may direct the operation of various modules within base station 110*x*. A memory 1368 may store data and program codes for base station 110*x*.

Figure 14:
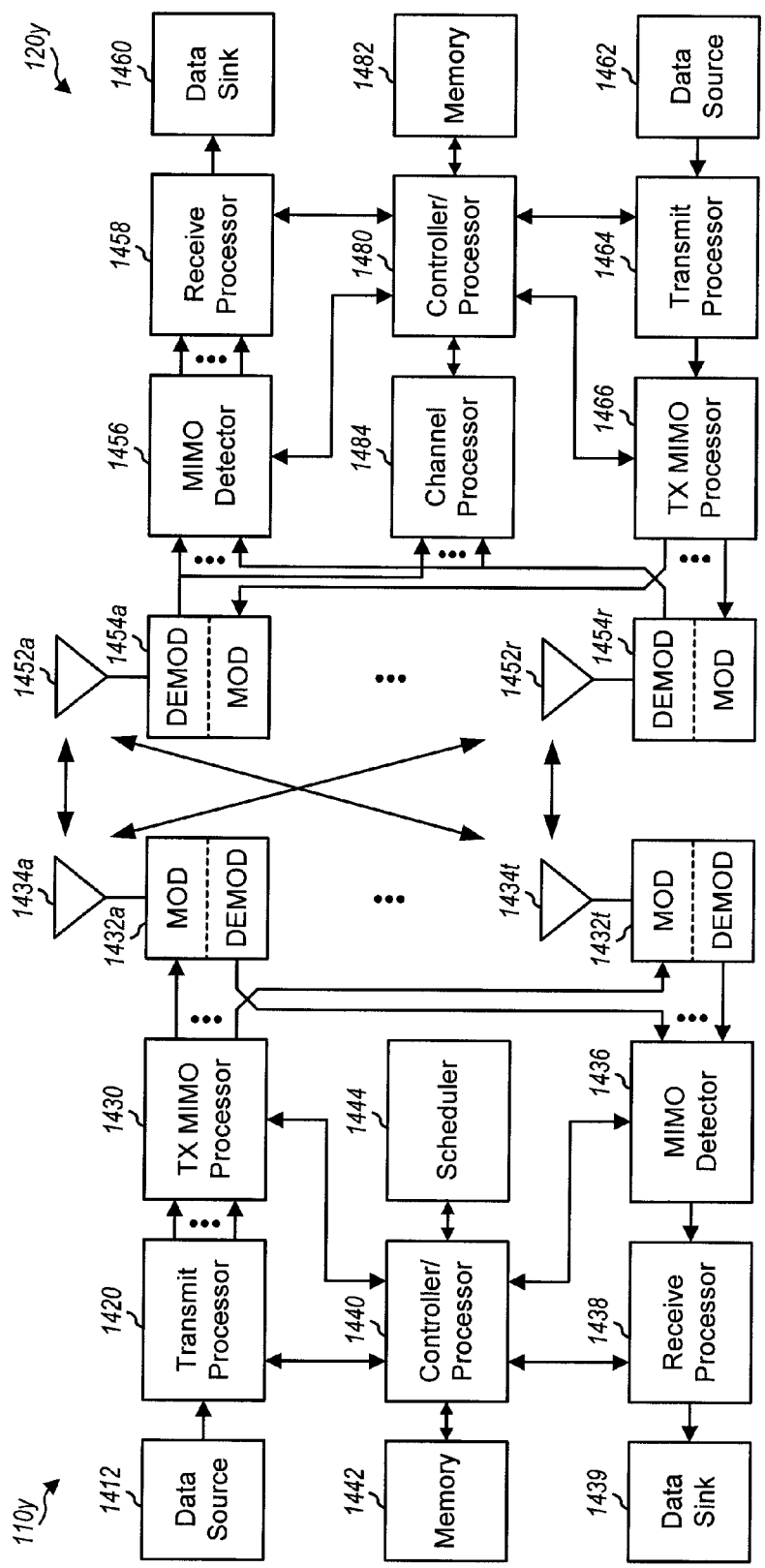
FIG. 14 shows another block diagram of a base station and a UE.

FIG. 14 shows a block diagram of a design of a base station/eNB 110*y* and a UE 120*y*, which may be one of the base stations/eNBs and one of the UEs in FIG. 1. Base station 110*y* may be equipped with T antennas 1434*a* through 1434*t*, and UE 120*y* may be equipped with R antennas 1452*a* through 1452*r*, where in general T≥1 and R≥1.

At base station 110*y*, a transmit processor 1420 may receive data from a data source 1412 for one or more UEs, process (e.g., encode and modulate) the data for each UE based on one or more modulation and coding schemes selected for that UE, and provide data symbols for all UEs. Transmit processor 1420 may also process control information (e.g., for downlink grants, uplink grants, configuration messages, etc.) and provide control symbols. Processor 1420 may also generate reference symbols for reference signals (e.g., CRS, CSI-RS, etc.). A transmit (TX) multiple-input multiple-output (MIMO) processor 1430 may precode the data symbols, the control symbols, and/or the reference symbols (if applicable) and may provide T output symbol streams to T modulators (MOD) 1432*a* through 1432*t*. Each modulator 1432 may process its output symbol stream (e.g., for OFDM, etc.) to obtain an output sample stream. Each modulator 1432 may further condition (e.g., convert to analog, amplify, filter, and upconvert) its output sample stream to obtain a downlink signal. T downlink signals from modulators 1432*a* through 1432*t* may be transmitted via T antennas 1434*a* through 1434*t*, respectively.

At UE 120*y*, antennas 1452*a* through 1452*r* may receive the downlink signals from base station 110*y* and/or other base stations and may provide received signals to demodulators (DEMODs) 1454*a* through 1454*r*, respectively. Each demodulator 1454 may condition (e.g., filter, amplify, downconvert, and digitize) its received signal to obtain input samples. Each demodulator 1454 may further process the input samples (e.g., for OFDM, etc.) to obtain received symbols. A MIMO detector 1456 may obtain received symbols from all R demodulators 1454*a* through 1454*r*, perform MIMO detection on the received symbols, and provide detected symbols. A receive processor 1458 may process (e.g., demodulate and decode) the detected symbols, provide decoded data for UE 120*y* to a data sink 1460, and provide decoded control information to a controller/processor 1480. A channel processor 1484 may measure the channel response and interference for different carriers based on reference signals received on these carriers and may determine CSI for each carrier of interest.

On the uplink, at UE 120*y*, a transmit processor 1464 may receive and process data from a data source 1462 and control information (e.g., CSI, etc.) from controller/processor 1480. Processor 1464 may also generate reference symbols for one or more reference signals. The symbols from transmit processor 1464 may be precoded by a TX MIMO processor 1466 if applicable, further processed by modulators 1454*a* through 1454*r* (e.g., for SC-FDM, OFDM, etc.), and transmitted to base station 110*y*. At base station 110*y*, the uplink signals from UE 120*y* and other UEs may be received by antennas 1434, processed by demodulators 1432, detected by a MIMO detector 1436 if applicable, and further processed by a receive processor 1438 to obtain decoded data and control information sent by UE 120*y* and other UEs. Processor 1438 may provide the decoded data to a data sink 1439 and the decoded control information to controller/processor 1440.

Controllers/processors 1440 and 1480 may direct the operation at base station 110*y* and UE 120*y*, respectively. Processor 1440 and/or other processors and modules at base station 110*y* may perform or direct process 1200 in FIG. 12 and/or other processes for the techniques described herein. Processor 1480 and/or other processors and modules at UE 120*y* may perform or direct process 700 in FIG. 7, process 900 in FIG. 9, process 1000 in FIG. 10, process 1100 in FIG. 11, and/or other processes for the techniques described herein. Memories 1442 and 1482 may store data and program codes for base station 110y and UE 120y, respectively. A scheduler 1444 may schedule UEs for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    determining, at a first node, at least one reference subframe for determining channel state information (CSI) for a plurality of carriers having at least two different configurations, wherein the plurality of carriers comprise one of: at least one carrier configured for frequency division duplexing (FDD) aggregated with at least one other carrier configured for time division duplexing (TDD), or a first carrier having a first uplink-downlink configuration aggregated with a second carrier having a second uplink-downlink configuration;
    determining the CSI for the plurality of carriers based on the at least one reference subframe;
    reporting the CSI for the plurality of carriers to a second node,
    wherein the determining the at least one reference subframe comprises determining a single reference subframe for all of the plurality of carriers, and determining whether the reference subframe is a valid downlink subframe for each of the plurality of carriers.

2. The method of claim 1, further comprising:
    receiving a CSI request for the plurality of carriers, wherein the CSI for the plurality of carriers is determined and reported in response to the CSI request.

3. The method of claim 1, further comprising:
    determining a configuration for periodic reporting of CSI by the UE, wherein the CSI for the plurality of carriers is determined and reported based on the configuration for periodic reporting of CSI by the UE.

4. The method of claim 1, wherein the determining the reference subframe comprises
    receiving a CSI request for the plurality of carriers in a first subframe, and determining the reference subframe based on the first subframe.

5. The method of claim 1, wherein the determining the CSI comprises determining CSI for each carrier for which the reference subframe is a valid downlink subframe, and wherein the reporting the CSI comprises reporting the CSI for each carrier for which the reference subframe is a valid downlink subframe for the carrier.

6. The method of claim 1, further comprising:
omitting reporting CSI for each carrier for which the reference subframe is not a valid downlink subframe.

7. The method of claim 1, further comprising:
omitting reporting CSI for all carriers if the reference subframe is not a valid downlink subframe for at least one carrier.

8. The method of claim 1, wherein the determining at least one reference subframe comprises determining a reference subframe for each of the plurality of carriers, and wherein the determining the CSI comprises determining CSI for each of the plurality of carriers based on the reference subframe for said each carrier.

9. The method of claim 8, wherein the determining the reference subframe for each of the plurality of carriers comprises
determining a CSI request for the plurality of carriers in a first subframe, and
determining the reference subframe for each of the plurality of carriers based on the first subframe.

10. The method of claim 8, wherein the determining the reference subframe for each of the plurality of carriers comprises
receiving a CSI request for the plurality of carriers in a first subframe,
determining a second subframe in which to report the CSI for the plurality of carriers based on the first subframe, and
determining the reference subframe for each of the plurality of carriers based on the second subframe.

11. The method of claim 9, wherein the reference subframe for each carrier is determined based further on a hybrid automatic retransmission (HARQ) timeline for the carrier.

12. The method of claim 9, wherein the reference subframe for each carrier is the first subframe or a subframe later than the first subframe.

13. The method of claim 1, wherein the plurality of carriers have a same offset between a first subframe in which a CSI request is sent and a second subframe in which the CSI is reported.

14. The method of claim 13, wherein the offset is dependent on the first subframe in which the CSI request is sent.

15. The method of claim 1, wherein the determining the CSI for the plurality of carriers comprises determining the CSI for the plurality of carriers based on at least one reference signal received in the at least one reference subframe.

16. An apparatus for wireless communication, comprising:
means for determining, at a first node, at least one reference subframe for determining channel state information (CSI) for a plurality of carriers having at least two different configurations, wherein the plurality of carriers comprise one of at least one carrier configured for frequency division duplexing (FDD) aggregated with at least one other carrier configured for time division duplexing (TDD), or a first carrier having a first uplink-downlink configuration aggregated with a second carrier having a second uplink-downlink configuration;
means for determining the CSI for the plurality of carriers based on the at least one reference subframe;
means for reporting the CSI for the plurality of carriers to a second nod;
wherein the means for determining at least one reference subframe comprises means for determining a single reference subframe for all of the plurality of carriers, and for determining whether the reference subframe is a valid downlink subframe for each of the plurality of carriers.

17. The apparatus of claim 16, wherein the plurality of carriers have a same offset between a first subframe in which a CSI request is sent and a second subframe in which CSI is reported.

18. An apparatus for wireless communication, comprising:
at least one processor configured to control operation of the apparatus to:
determine, at a first node, at least one reference subframe for determining channel state information (CSI) for a plurality of carriers having at least two different configurations, to determine the CSI for the plurality of carriers based on the at least one reference subframe, and to report the CSI for the plurality of carriers to a second node, wherein the plurality of carriers comprise one of: at least one carrier configured for frequency division duplexing (FDD) aggregated with at least one other carrier configured for time division duplexing (TDD), or a first carrier having a first uplink-downlink configuration aggregated with a second carrier having a second uplink-downlink configuration;
determine a single reference subframe for all of the plurality of carriers; and
determine whether the reference subframe is a valid downlink subframe for each of the plurality of carriers.

19. The apparatus of claim 18, wherein the plurality of carriers have a same offset between a first subframe in which a CSI request is sent and a second subframe in which CSI is reported.

20. A computer program product, comprising:
a non-transitory computer-readable medium comprising:
code for causing at least one processor to determine, at a first node, at least one reference subframe for determining channel state information (CSI) for a plurality of carriers having at least two different configurations, wherein the plurality of carriers comprise one of: at least one carrier configured for frequency division duplexing (FDD) aggregated with at least one other carrier configured for time division duplexing (TDD), or a first carrier having a first uplink-downlink configuration aggregated with a second carrier having a second uplink-downlink configuration;
code for causing the at least one processor to determine the CSI for the plurality of carriers based on the at least one reference subframe;
code for causing the at least one processor to report the CSI for the plurality of carriers to a second nod;
wherein the code for causing the at least one processor to determine at least one reference subframe comprises code for causing the at least one processor to determine a single reference subframe for all of the plurality of carriers, and code for causing the at least one processor to determine whether the reference subframe is a valid downlink subframe for each of the plurality of carriers.

21. A method for wireless communication, comprising:
receiving, from a node, channel state information (CSI) for a plurality of carriers having at least two different configurations, wherein the plurality of carriers comprise one of: at least one carrier configured for frequency division duplexing (FDD) aggregated with at least one other carrier configured for time division duplexing (TDD), or a first carrier having a first uplink-downlink configuration aggregated with a second carrier having a second uplink-downlink configuration;

scheduling the node for data transmission based on the CSI for the plurality of carrier % and sending a CSI request for the plurality of carriers in a first subframe to the node, wherein the CSI for the plurality of carriers is determined by the node based on a single reference subframe and the CSI for the plurality of carriers includes CSI for each carrier for which the reference subframe is a valid downlink subframe.

22. The method of claim 21, further comprising:
sending a CSI request for the plurality of carriers to the node, wherein the CSI for the plurality of carriers is determined and reported by the node in response to the CSI request.

23. The method of claim 21, further comprising:
sending a configuration for periodic reporting of CSI to the node, wherein the CSI for the plurality of carriers is determined and reported by the node based on the configuration for periodic reporting of CSI by the node.

24. The method of claim 21, wherein the reference subframe for each carrier is determined based further on a hybrid automatic retransmission (HARQ) timeline for the carrier.

25. The method of claim 21, wherein the reference subframe for each carrier is the first subframe or a subframe later than the first subframe.

26. The method of claim 21, wherein the plurality of carriers have a same offset between a first subframe in which a CSI request is sent and a second subframe in which CSI is reported.

27. An apparatus for wireless communication, comprising:
means for receiving, from a node, channel state information (CSI) for a plurality of carriers having at least two different configurations, wherein the plurality of carriers comprise one of: at least one carrier configured for frequency division duplexing (FDD) aggregated with at least one other carrier configured for time division duplexing (TDD), or a first carrier having a first uplink-downlink configuration aggregated with a second carrier having a second uplink-downlink configuration;

means for scheduling the node for data transmission based on the CSI for the plurality of carriers; and means for sending a CSI request for the plurality of carriers in a first subframe to the node, wherein the CSI for the plurality of carriers is determined by the node based on a single reference subframe and the CSI for the plurality of carriers includes CSI for each carrier for which the reference subframe is a valid downlink subframe.

28. The apparatus of claim 27, further comprising:
means for sending a CSI request for the plurality of carriers in a first subframe to the node, wherein CSI for each of the plurality of carriers is determined by the node based on a reference subframe determined for said each carrier based on the first subframe.

29. The apparatus of claim 27, wherein the plurality of carriers have a same offset between a first subframe in which a CSI request is sent and a second subframe in which CSI is reported.

30. An apparatus for wireless communication, comprising:
at least one processor configured to control operation of the apparatus to:
receive, from a node, channel state information (CSI) for a plurality of carriers having at least two different configurations,
schedule the node for data transmission based on the CSI for the plurality of carriers,
send a CSI request for the plurality of carriers to the node, wherein the CSI for the plurality of carriers is determined by the node based on a single reference subframe,
wherein the CSI for the plurality of carriers includes CSI for each carrier for which the reference subframe is a valid downlink subframe, and the plurality of carriers comprise one of: at least one carrier configured for frequency division duplexing (FDD) aggregated with at least one other carrier configured for time division duplexing (TDD), or a first carrier having a first uplink-downlink configuration aggregated with a second carrier having a second uplink-downlink configuration.

31. The apparatus of claim 30, wherein the plurality of carriers have a same offset between a first subframe in which a CSI request is sent and a second subframe in which CSI is reported.

32. A computer program product, comprising:
a non-transitory computer-readable medium comprising:
code for causing at least one processor to receive, from a node, channel state information (CSI) for a plurality of carriers having at least two different configurations, wherein the plurality of carriers comprise one of at least one carrier configured for frequency division duplexing (FDD) aggregated with at least one other carrier configured for time division duplexing (TDD), or a first carrier having a first uplink-downlink configuration aggregated with a second carrier having a second uplink-downlink configuration;

code for causing the at least one processor to schedule the node for data transmission based on the CSI for the plurality of carriers; and code for sending a CSI request for the plurality of carriers in a first subframe to the node, wherein the CSI for the plurality of carriers is determined by the node based on a single reference subframe and the CSI for the plurality of carriers includes CSI for each carrier for which the reference subframe is a valid downlink subframe.

* * * * *